US010899016B2

(12) United States Patent
Low et al.

(10) Patent No.: US 10,899,016 B2
(45) Date of Patent: Jan. 26, 2021

(54) ROBOT AND ROBOT CONTROL SYSTEM

(71) Applicants: SRI INTERNATIONAL, Menlo Park, CA (US); YAMAHA HATSUDOKI KABUSHIKI KAISHA, Shizuoka (JP)

(72) Inventors: Thomas Low, Belmont, CA (US); Thomas De Candia, Redwood City, CA (US); Seungkook Yun, San Jose, CA (US); Thomas Egan, Marblehead, MA (US); Bryan Chavez, Palo Alto, CA (US); Alexander Kernbaum, Sunnyvale, CA (US); Riley Shear, Redwood City, CA (US); Leonard Gerard, San Francisco, CA (US); Stephen Morfey, Anstey (GB); Richard Mahoney, Los Altos, CA (US); Regis Vincent, San Mateo, CA (US); Paul Birkmeyer, Redwood City, CA (US); Hiroyuki Morita, Shizuoka (JP); Hirokatsu Muramatsu, Shizuoka (JP); Keiji Nishimura, Cypress, CA (US); Hiroshi Saijou, Cypress, CA (US); Akira Satou, Shizuoka (JP); Toshifumi Uchiyama, Cypress, CA (US); Hitoshi Watanabe, Shizuoka (JP); Shirou Watanabe, Shizuoka (JP)

(73) Assignees: SRI INTERNATIONAL, Menlo Park, CA (US); YAMAHA HATSUDOKI KABUSHIKI KAISHA, Iwata (JP)

( * ) Notice: Subject to any disclaimer, the term of this patent is extended or adjusted under 35 U.S.C. 154(b) by 310 days.

(21) Appl. No.: 15/768,311

(22) PCT Filed: Oct. 21, 2016

(86) PCT No.: PCT/US2016/058039
§ 371 (c)(1),
(2) Date: Apr. 13, 2018

(87) PCT Pub. No.: WO2017/070426
PCT Pub. Date: Apr. 27, 2017

(65) Prior Publication Data
US 2018/0297209 A1      Oct. 18, 2018

Related U.S. Application Data

(60) Provisional application No. 62/248,445, filed on Oct. 30, 2015, provisional application No. 62/245,564, filed on Oct. 23, 2015.

(51) Int. Cl.
*B25J 11/00* (2006.01)
*B25J 9/10* (2006.01)
(Continued)

(52) U.S. Cl.
CPC ............ *B25J 11/00* (2013.01); *B25J 9/0015* (2013.01); *B25J 9/0087* (2013.01); *B25J 9/104* (2013.01);
(Continued)

(58) Field of Classification Search
None
See application file for complete search history.

(56) References Cited

U.S. PATENT DOCUMENTS 3,465,577 A * 9/1969 Donovan ................. G12B 9/02
73/118.01
3,546,814 A * 12/1970 Melendez ............... A63H 17/36
446/288
(Continued)

FOREIGN PATENT DOCUMENTS

JP   2001-281107 A   10/2001
JP   2006-084285 A    3/2006
(Continued)

OTHER PUBLICATIONS

The International Search Report (ISR) for PCT/US2016/058039 dated Feb. 1, 2017, pp. 1-3.
(Continued)

*Primary Examiner* — Bhavesh V Amin
(74) *Attorney, Agent, or Firm* — McDonnell Boehnen Hulbert & Berghoff LLP

(57) ABSTRACT

An example system includes a vehicle, a robot, and a controller. The vehicle may include an accelerator operator and a steering operator. The robot may include as accelerator actuator configured to operate the accelerator operator, and a steering actuator configured to operate-the steering operator. The controller is configured to: in response to an accelerator command, send a first signal to the accelerator actuator to operate the accelerator operator of the vehicle, and in response to a steering command, send a second, signal to the steering actuator to steer the vehicle.

30 Claims, 15 Drawing Sheets

(51) Int. Cl.
| | |
|---|---|
| B25J 13/08 | (2006.01) |
| B25J 19/02 | (2006.01) |
| B25J 9/00 | (2006.01) |
| B25J 9/16 | (2006.01) |
| G05D 1/00 | (2006.01) |
| G05D 1/02 | (2020.01) |
| G06K 9/00 | (2006.01) |

(52) U.S. Cl.
CPC ........... *B25J 9/1682* (2013.01); *B25J 11/008* (2013.01); *B25J 13/08* (2013.01); *B25J 19/02* (2013.01); *B25J 19/023* (2013.01); *G05D 1/0088* (2013.01); *G05D 1/0278* (2013.01); *G06K 9/00664* (2013.01); *G06K 9/00805* (2013.01)

(56) References Cited

U.S. PATENT DOCUMENTS

| | | | | |
|---|---|---|---|---|
| 3,826,038 | A * | 7/1974 | Gentilini | A63H 17/16 446/286 |
| 4,046,262 | A * | 9/1977 | Vykukal | B25J 3/04 414/5 |
| 4,742,720 | A * | 5/1988 | Storck | B60T 17/223 73/865.9 |
| 4,799,915 | A * | 1/1989 | Lehmann | A63H 17/25 446/279 |
| 5,029,894 | A * | 7/1991 | Willman | B62H 1/12 280/755 |
| 5,172,589 | A * | 12/1992 | Witt | B60S 5/00 73/132 |
| 5,363,027 | A * | 11/1994 | Noguchi | F16H 61/28 318/266 |
| 5,368,516 | A * | 11/1994 | Hoeting | A63H 17/21 446/288 |
| 5,394,743 | A * | 3/1995 | Noguchi | G01M 13/02 701/1 |
| 5,865,266 | A * | 2/1999 | Froelich | B25J 9/1689 180/443 |
| 6,141,603 | A * | 10/2000 | Greenhill | G01L 5/22 318/587 |
| 7,357,416 | B2 * | 4/2008 | Wagner | B62H 1/12 280/5.506 |
| 7,628,239 | B1 * | 12/2009 | Louie | B62D 1/00 180/167 |
| 8,051,936 | B1 * | 11/2011 | Hebert | B60T 7/16 180/167 |
| 8,078,338 | B2 * | 12/2011 | Pack | G05D 1/0011 701/1 |
| 8,255,093 | B2 * | 8/2012 | Layton | G05D 1/0038 701/2 |
| 8,480,111 | B1 * | 7/2013 | Kuo | B62H 1/00 280/293 |
| 9,844,880 | B1 * | 12/2017 | Takach | B60T 7/12 |
| 10,613,544 | B2 * | 4/2020 | Guterman | G05D 1/0088 |
| 2003/0102657 | A1 * | 6/2003 | Kuo | B62J 17/08 280/755 |
| 2005/0248140 | A1 * | 11/2005 | Wagner | B62H 1/12 280/755 |
| 2009/0084623 | A1 * | 4/2009 | Dagenais | B60W 30/02 180/210 |
| 2009/0103319 | A1 * | 4/2009 | Peeters | B60T 8/1706 362/465 |
| 2009/0222164 | A1 * | 9/2009 | Seiniger | B60T 8/172 701/36 |
| 2010/0168958 | A1 * | 7/2010 | Baino | B60Q 1/12 701/36 |
| 2012/0239264 | A1 * | 9/2012 | Kojima | F16H 61/0437 701/53 |
| 2013/0090828 | A1 * | 4/2013 | Lemejda | B62J 27/00 701/83 |
| 2013/0261925 | A1 * | 10/2013 | Kobayashi | B60K 28/16 701/85 |
| 2014/0027998 | A1 * | 1/2014 | Thiers | B62K 21/00 280/276 |
| 2015/0149021 | A1 * | 5/2015 | Duncan | B60W 30/12 701/23 |

FOREIGN PATENT DOCUMENTS

| | | |
|---|---|---|
| JP | 2008-79371 A | 4/2008 |
| JP | 2008-175564 A | 7/2008 |
| KR | 10-1446111 B1 | 11/2014 |
| WO | 2014/151065 A2 | 9/2014 |

OTHER PUBLICATIONS

The Written Opinion of the International Searching Authority for PCT/US2016/058039 dated Feb. 1, 2017, pp. 1-11.

European Search Report, European Patent Application No. 16858265.8, dated Oct. 18, 2018, 10 pages.

Ikinamo: Amazing Bike Riding Robot! Can Cycle, Balance, Steer, and Correct Itself, YouTube, Retrieved from the Internet: URL:https://www.youtube.com/watch?v=mT3vfSQePcs, Nov. 11, 2011, 1 page.

Castrol Poweri Biking: Castol Motobot (aka Flossie) Conquers Daytona, YouTube, Retrieved from the Internet: URL: https://www.youtube.com/watch?v=r5Eb0pnhl_Q, Aug. 31, 2014, 1 page.

Guizzo, Erico et al., "The hard lessons of DARPA's robotics challenge," IEEE Spectrum, vol. 52, No. 8, pp. 11-13 (Aug. 1, 2015).

Communication pursuant to Article 94(3) EPC, dated Jul. 30, 2019, in European Patent Application No. 16858265.8.

\* cited by examiner

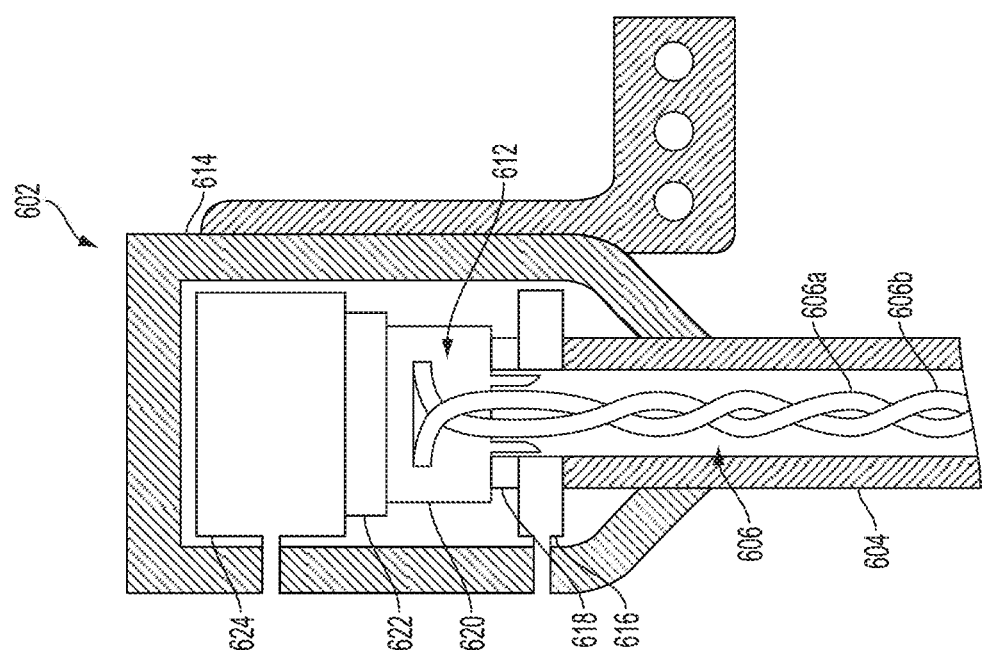
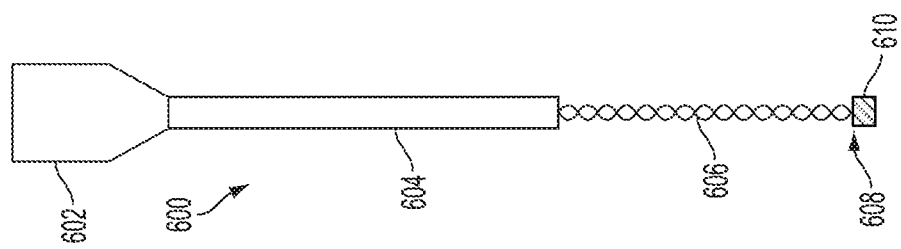
FIGURE 6B
FIGURE 6A

ROBOT AND ROBOT CONTROL SYSTEM

CROSS REFERENCE TO RELATED APPLICATION

The present application claims priority to U.S. Provisional patent application No. 62/248,445, filed on Oct. 30, 2015, and entitled "Robotic Rider Steering Mechanism" and U.S. Provisional patent application No. 62/245,564, filed on Oct. 23, 2015, and entitled "Robot and Robot Control System," both of which are herein incorporated by reference as if fully set forth in this description.

BACKGROUND

Vehicles include multiple systems such as propulsion, steering, braking, etc. Before a vehicle is mass produced, prototype vehicles are tested to assess performance of the vehicle. For instance road tests are conducted to assess vehicle speed, maneuverability, responsiveness, etc. During testing, data is acquired to evaluate performance of the vehicle. Vehicle design may then be changed or tuned to improve performance.

Recent advances in automatic control systems and technology has led to designing test vehicles configured to be operated automatically to perform the tests. However, these new control systems are integrated into new vehicles and might not be adaptable for use with existing vehicles.

SUMMARY

The present disclosure describes embodiments that relate to a robot and robot control system.

In one aspect, the present disclosure describes a robot configured to drive a vehicle. The robot includes: (i) an accelerator actuator configured to operate an accelerator operator of the vehicle; (ii) an arm configured to steer the vehicle; (iii) an actuator coupled to the arm via a link; and (iv) a controller. The controller is configured to, in response to an accelerator command, send a first signal to the accelerator actuator to operate the accelerator operator. The controller is also configured to, in response to a steering command, send a second signal to the actuator, thereby causing the actuator to apply a particular torque to the link so as to steer the vehicle.

In another aspect, the present disclosure describes a system. The system includes a vehicle. The vehicle includes an accelerator operator and a steering operator. The system also includes a robot. The robot includes: (i) an accelerator actuator coupled to the accelerator operator of the vehicle and configured to operate the accelerator operator, and (ii) a steering actuator coupled to the steering operator of the vehicle and configured to operate the steering operator. The system also includes at least one outrigger coupled to the vehicle or the robot and configured to be in either an undeployed state or a deployed state, where in the deployed state, the outrigger is configured to engage a surface when the vehicle is at a predetermined lean angle to laterally stabilize the vehicle. The system further includes an outrigger actuator configured to switch the outrigger from the undeployed state to the deployed state. The system further includes a controller configured to: (i) in response to an accelerator command, send a first signal to the accelerator actuator to operate the accelerator operator of the vehicle, (ii) in response to a steering command, send a second signal to the steering actuator to steer the vehicle, and (iii) in response to an outrigger deploy signal, send a third signal to actuate the outrigger actuator so as to switch the outrigger from the undeployed state to the deployed state to laterally stabilize the vehicle.

In another aspect, the present disclosure describes a system. The system includes a vehicle. The vehicle includes an accelerator operator and a steering operator. The system also includes a robot. The robot includes: (i) an accelerator actuator coupled to the accelerator operator of the vehicle and configured to operate the accelerator operator, and (ii) a steering actuator coupled to the steering operator of the vehicle and configured to operate the steering operator. The system further includes a controller configured to: (i) in response to an accelerator command, send a first signal to the accelerator actuator to operate the accelerator operator of the vehicle, and (ii) in response to a steering command, send a second signal to the steering actuator to steer the vehicle.

In still another aspect, the present disclosure describes a steering system. The steering system includes a robot. The robot includes: (i) a first arm and a second arm, and (ii) an actuator coupled to the first arm via a first link and coupled to the second arm via a second link. The steering system also includes a vehicle. The vehicle includes: a handlebar. The first arm is coupled to a first end of the handlebar and the second arm is coupled to a second end of the handlebar, such that position of the actuator determines an angle of the handlebar, thereby determining corresponding steering angle of the vehicle.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 6A illustrates a twisted string actuator, in accordance with an example implementation.

FIG. 6B illustrates a close-up, cutaway view of elements of the twisted string actuator shown in FIG. 6A, in accordance with an example implementation.

DETAILED DESCRIPTION

Figure 1:
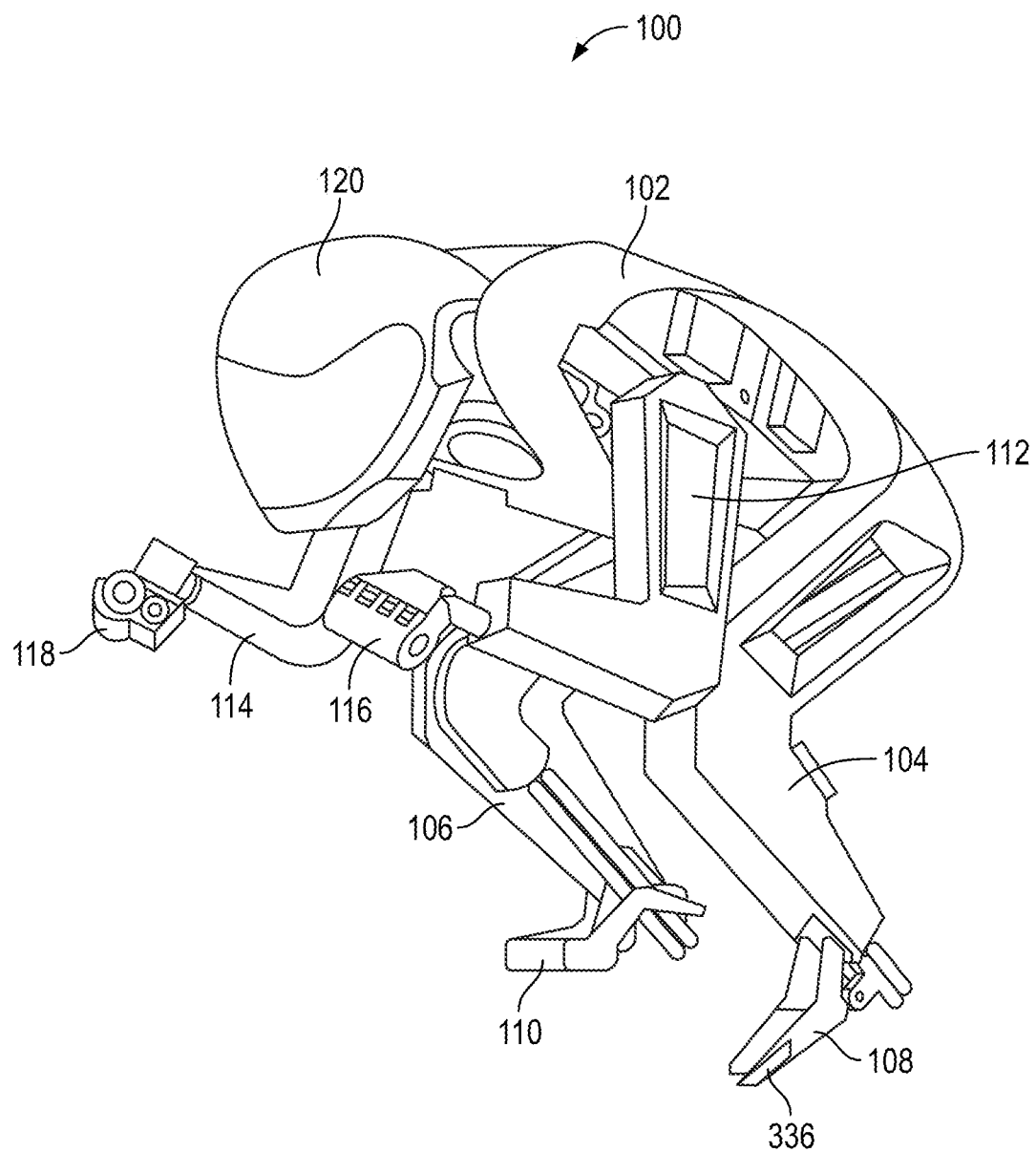
FIG. 1 illustrates a perspective view of a robot, in accordance with an example implementation.

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

I. OVERVIEW

Vehicles can be tested in several ways to evaluate their performance. For example, a human driver can drive a vehicle while data acquisition systems are connected to various vehicle systems to record sensor data while the driver operates the vehicle. The driver himself may also be monitored to evaluate driving aspects such as comfort, body acceleration and movements while maneuvering the vehicle, extent of motion while the vehicle is passing over a bump, etc. In this example, sensors could be coupled to a body of the driver and cameras or other image-capture devices could be used to take images and videos of the driver for later evaluation.

In another example, to reduce the burden of monitoring the human driver, a robot may ride along with the human driver in the vehicle, and the robot may be equipped with sensors and cameras configured to monitor the human driver. In another example, instead of a human driver, the vehicle may include autonomous control systems configured to operate the vehicle during testing. These systems may be beneficial in conducting destructive tests, for example, to avoid any likelihood of injuring a human driver. However, in this example, data associated with monitoring and evaluating the driver (comfort, body acceleration, etc.) is not available.

In another example, as disclosed herein, a robot configured to mimic human behavior may be configured to mount the vehicle and drive it during vehicle tests. In this manner, vehicle performance is tested and at the same time the robot, which is equipped with multiple sensor systems, is self-monitoring. Data from the robot's sensor systems can later be acquired and evaluated. Also, using a robot to drive the vehicle is beneficial in avoiding injuries to human drivers.

Further, another advantage of using such a human-mimicking robot is avoiding costly modification to the vehicle. Similar to a human driver, the robot may be configured to operate existing vehicle systems such as accelerator pedal, brakes, steering wheel with little or no modification to these systems. A further advantage of using such a human-mimicking robot is to automate transportation with little or no modification to the vehicle. A vehicle could be a mobile machine that can be used to transport a person, people, or cargo. Any vehicle discussed herein can be driven and/or otherwise guided along a path on land, in water, on water, or in the air or outer space.

Disclosed herein are a robot, robot control systems, and vehicle systems and apparatuses that enable operating a vehicle by a human-mimicking robot. The robot is adaptable to drive a vehicle, and the robot may include components and actuators that enable the robot to mimic a human driver.

II. EXAMPLE ROBOT AND VEHICLE

FIG. 1 illustrates a perspective view of a robot 100, in accordance with an example implementation. The robot 100 is a humanoid or human-mimicking robot and may be configured as a rider of a vehicle. In the description presented herein a motorcycle is used as an example vehicle, but the robot 100 may be configured to ride other vehicle types.

The robot 100 is shown in FIG. 1 in a driving position of a motorcycle. The robot 100 includes a main body 102, left leg 104, right leg 106, left foot 108, right foot 110, left arm 112, right arm 114, left hand 116, right hand 118, and a head 120. The main body 102 is adapted to confirm to a driver's seat of a motorcycle as shown and described below with respect to FIG. 2. The left and right legs 104 and 106, the left and right arms 112 and 114, and the head 120 are connected to the main body 102.

Figure 2:
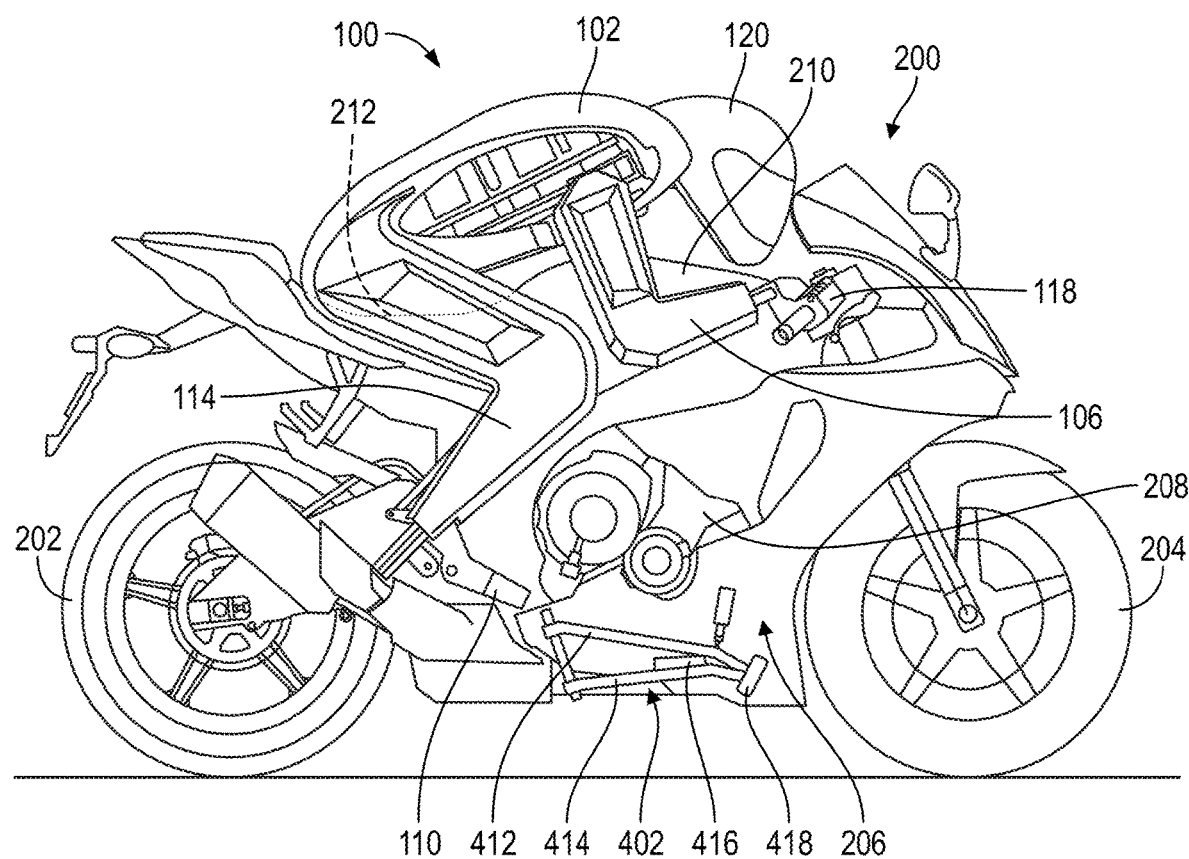
FIG. 2 illustrates a side view of a robot riding a motorcycle, in accordance with an example implementation.

FIG. 2 illustrates a side view of the robot 100 riding a motorcycle 200, in accordance with an example implementation. The motorcycle 200 includes a rear wheel 202, a front wheel 204, and a vehicle body 206. An engine 208 is mounted to or within the vehicle body 206 and is configured to power the motorcycle 200. A fuel tank 210 is mounted above the engine 208, and a driver's seat 212 is disposed at a rear end of the fuel tank 210.

Figure 3A:
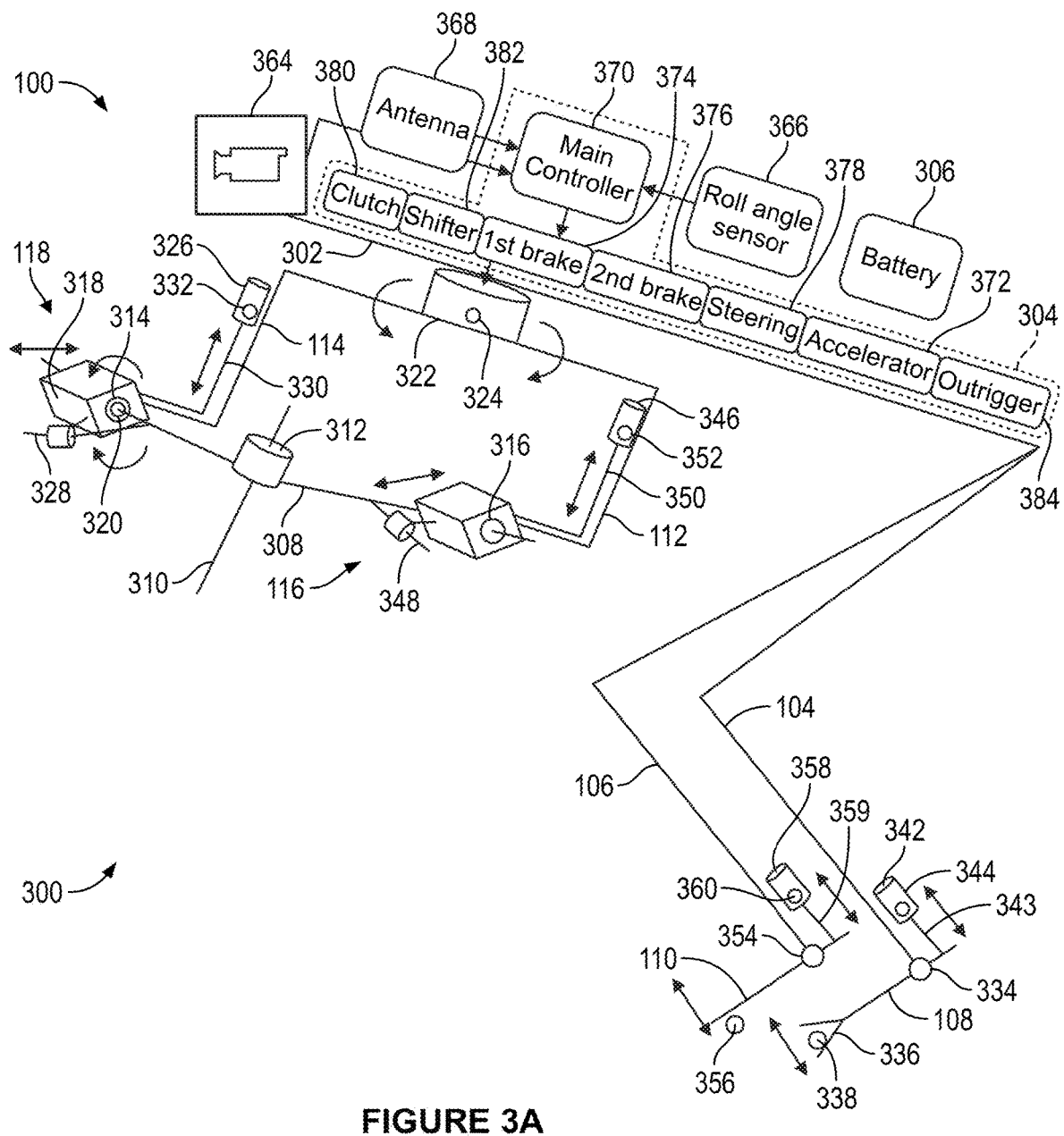
FIG. 3A illustrates a schematic diagram showing a configuration of a robot control system, in accordance with an example implementation.

FIG. 3A illustrates a schematic diagram showing a configuration of a robot control system 300, in accordance with an example implementation. As shown in FIG. 3A, the robot 100 includes a body frame 302 disposed within the main body 102 shown in FIGS. 1 and 2. A control unit 304 and a battery 306 are mounted to the body frame 302. The battery 306 provides electric power to various systems of the robot 100 such as the control unit 304, sensors, etc.

The motorcycle 200 includes a handlebar 308 configured to operate as steering member for the motorcycle 200. The handlebar 308 is rotatable around a steering shaft 310. By pivoting the handlebar 308 left and right about the steering shaft 310, the front wheel 204 of the motorcycle 200 is rotated to the left and right. A position sensor 312 is mounted to the handlebar 308 or the steering shaft 310. In other examples, the position sensor 312 could be mounted on a steering actuator 322 instead of on the handlebar 308 or the steering shaft 310. The position sensor 312 is configured to detect a steering angle of the handlebar 308, and provide a detection signal indicating the steering angle of the handlebar 308 to the control unit 304.

An accelerator 314 is attached to the handlebar 308. The accelerator 314 includes an accelerator grip that is rotatable by the right hand 118 of the robot 100 to vary a throttle opening of the engine 208. The motorcycle 200) also includes a left grip 316 mounted on the left side of the handlebar 308, and the left hand 116 of the robot 100 is configured to grip the left grip 316.

As shown in FIG. 3A, the robot 100 has an accelerator actuator 318 mounted or coupled to the right hand 118. The accelerator actuator 318 may include, for example, an electric motor configured to operate the accelerator 314 based on a first driving signal input from the control unit 304. For instance, in response to the first driving signal, the accelerator actuator 318 may be configured to rotate the accelerator 314 in a clockwise direction or a counter-clockwise direction.

Rotating the accelerator 314 in one direction about a longitudinal axis of the accelerator grip may correspond to opening the throttle of the engine 208, whereas rotating the accelerator 314 in the other direction may correspond to closing the throttle of the engine 208, or vice versa. Thus, in response to rotating the accelerator 314 in a direction corresponding to opening the throttle, rotational speed of the engine 208 increases, and in response to rotating the accelerator 314 in a direction corresponding to closing the throttle, rotational speed of the engine 208 decreases. If no signal is provided to the accelerator actuator 318, the accelerator 314 returns to a neutral state that corresponds to a fully closed position of the throttle.

The accelerator actuator 318 includes a position sensor 320 configured to detect rotational position of the accelerator 314, and output a detection signal indicating the rotational position of the accelerator 314 to the control unit 304. The control unit 304 may thus use this signal to implement a closed-loop feedback control of the rotational position of the accelerator 314, and thus the speed of the motorcycle 200.

The right hand 118 is attached to a distal end of the right arm 114 and the left hand 116 is attached to a distal end of the left arm 112. The left and right arms 112 and 114 are connected to the body frame 302 via the steering actuator 322 (e.g., a rotary actuator 508 described below). The steering actuator 322 may include, for example, an electric motor configured to rotate the left and right arms 112 and 114 to the left and right directions and apply a torque thereto in response to a second driving signal input from the control unit 304.

By rotating the left and right arms 112 and 114 to pivot to the left, the handlebar 308 is turned to the left, and the motorcycle 200 turns to the left. By rotating the left and right arms 112 and 114 to pivot to the right, the handlebar 308 is turned to the right, and the motorcycle 200 turns to the right.

The steering actuator 322 may include a torque sensor 324. The torque sensor 324 may be configured to detect a torque applied to the left and right arms 112 and 114 and output a detection signal indicating the torque applied to the left and right arms 112 and 114 to the control unit 304. The control unit 304 may then use this signal to implement a closed-loop feedback control of the steering actuator 322 such that the steering actuator 322 applies a particular torque to the arms 112 and 114, and thus controls the steering angle or the lean angle of the motorcycle 200. An example steering mechanism and control system are described below with respect to FIGS. 5A-5B.

The robot 100 may further include a first brake actuator 326 coupled to a first brake operator 328 of the motorcycle 200. For instance, the first brake operator 328 may be a brake lever disposed in front of the accelerator 314. The first brake actuator 326 may include, for example, an electric motor coupled to the right arm 114. However, other actuator types could be used such as hydraulic or pneumatic cylinders.

In an example, the first brake actuator 326 could be connected to the first brake operator 328 through a link member 330. The link member 330 may include a wire or string (e.g., the twisted string 606 described below with respect to FIGS. 6A-6B) attached to the first brake operator 328. The first brake actuator 326 may be configured to operate the first brake operator 328 in response to a third driving signal input from the control unit 304. Particularly, the first brake actuator 326 may move the first brake operator 328 in a braking direction (e.g., inward toward the robot 100) or a non-braking direction (e.g., outward away from the robot 100) in response to the third driving signal input from the control unit 304.

When the first brake operator 328 is moved in the braking direction, the braking force applied by front brakes of the motorcycle 200 is increased. When the first brake operator 328 is moved in the non-braking direction, the braking force applied by the front brakes is reduced.

Further, the first brake actuator 326 may include a torque sensor 332. The torque sensor 332 may be configured to detect a torque applied to a first brake operator 328 and output a detection signal to the control unit 304. Based on the torque detection signal from the torque sensor 332, the control unit 304 provides a signal to a mechanism integrated into the right hand 118 of the robot 100 and configured to move or apply the front brakes. In an example, the higher the torque applied to the first brake operator 328, the higher the braking force to be applied by the front brakes and vice versa.

As shown in FIG. 3A, the left foot 108 is attached to a distal end of the left leg 104. Particularly, the left foot 108 may be rotatably mounted to the left leg 104 around a pivot or ankle 334. A locking member 336 is coupled to a tip of the left foot 108 and is configured to engage a transmission gear shift operator 338 of the motorcycle 200. The shift operator 338 may, for example, be configured as a shift pedal. The locking member 336 is configured to move the shift operator 338 between a shift-down position and a shift-up position to change gears or transmission ratios of a transmission (e.g., a gearbox) coupled to the engine 208.

Figure 3B:
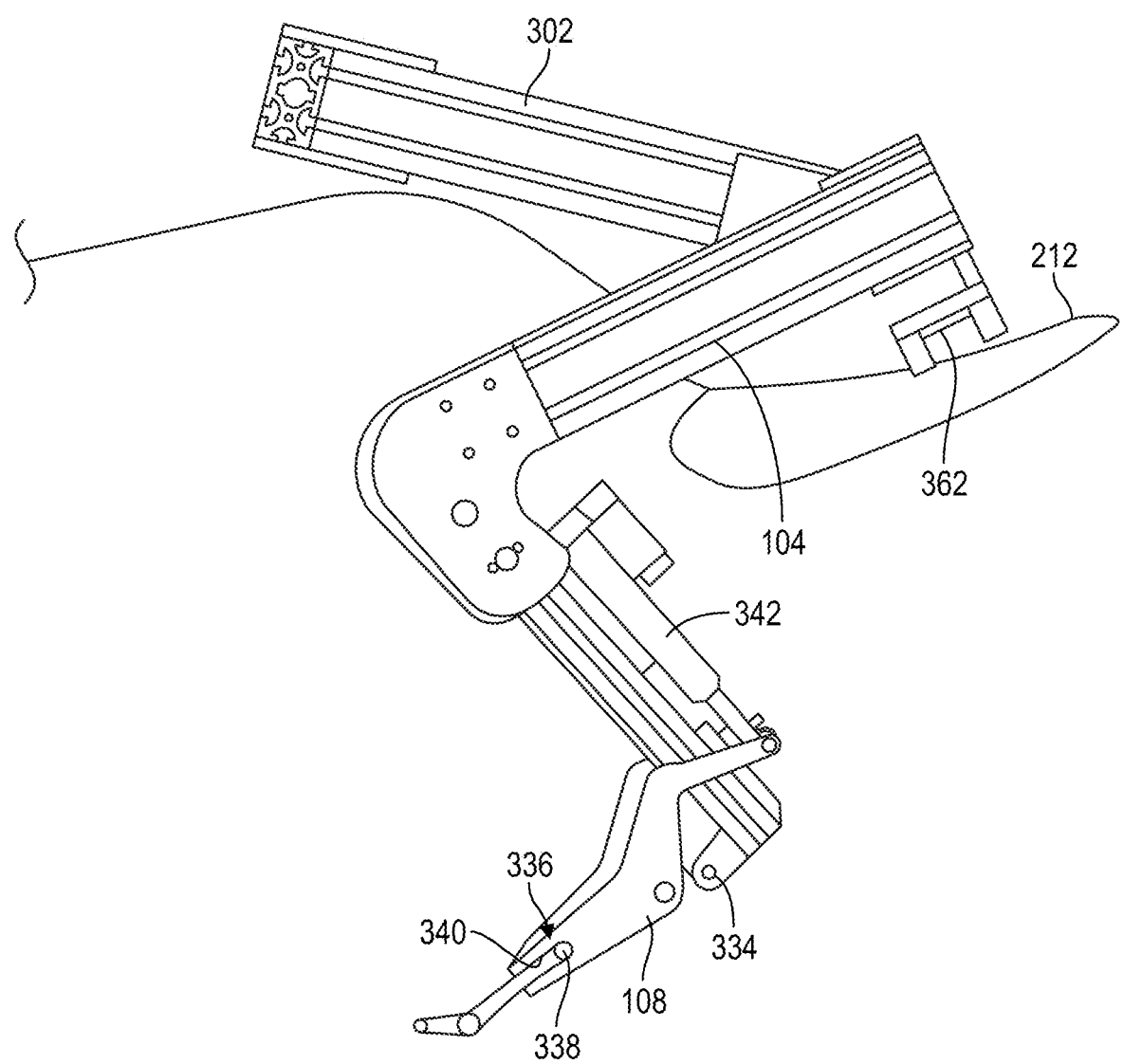
FIG. 3B illustrates zoomed-in side view of a left foot and a left leg of a robot, in accordance with an example implementation.

FIG. 3B illustrates zoomed-in side view of the left foot 108 and the left leg 104, in accordance with an example implementation. As shown in FIG. 3B, the locking member 336 has a recess 340. The locking member 336 is arranged such that the operator 338 is sandwiched by or within the recess 340.

As shown in FIGS. 3A-3B, the robot 100 includes a shift actuator 342 coupled to the left leg 104. The shift actuator 342 is also coupled to the shift operator 338 via the left foot 108, and is configured to operate the shift operator 338 based on a fourth drive signal input from the control unit 304. The shift actuator 342 could be, for example, a hydraulic or pneumatic cylinder. As the actuator extends and retracts, the left foot 108 rotates about the ankle 334. In another example, the shift actuator 342 may include an electric linear motor. In another example, the shift actuator 342 may be coupled to the left foot 108 via a link member 343 shown in FIG. 3A. The link member 343 may include a wire or string (e.g., the twisted string 606 described below with respect to FIGS. 6A-6B) attached to the left foot 108 such that the shift actuator 342 could move the left foot 108 via the link member 343. Any other actuation mechanism could be used.

As an example for illustration, if the shift actuator 342 retracts, the shift operator 338 rotates counter-clockwise from a perspective of a viewer of FIGS. 3A-3B (i.e., the shift operator 338 is depressed downwardly) by the left foot 108. As a result, the transmission shifts down, i.e., shifts to a gear with a higher gear ratio. On the other hand, if the shift actuator 342 extends, the shift operator 338 rotates clockwise (i.e., moves upward) by the left foot 108, thus causing the transmission to shift up, i.e., shift to a gear with a smaller gear ratio. However, the operation direction of the shift operator 338 for shifting up and shifting down is not limited to these directions.

As illustrated in FIG. 3A, the shift actuator 342 may include a position sensor 344 configured to detect position of the shift operator 338 or the shift actuator 342. The position sensor 344 outputs a detection signal indicating the position of the shift operator 338 to the control unit 304. The control unit 304 may use this signal to control the position of the shift operator 338, and thus control the transmission ratio at which the motorcycle 200 operates.

The robot 100 also has a clutch actuator 346. The clutch actuator 346 is connected to a clutch operator 348 of the motorcycle 200. The clutch operator 348 could include a clutch lever arranged in front of the left grip 316. The clutch actuator 346 could include, for example, an electric motor mounted on the left arm 112 of the robot 100. The clutch actuator 346 may be connected to the clutch operator 348 through a link member 350. The link member 350 could be, for example, a wire or string (e.g., the twisted string 606 described below with respect to FIGS. 6A-6B) attached to the clutch operator 348. Other actuation mechanisms are possible.

The clutch actuator 346 is configured to operate the clutch operator 348 based on a fifth driving signal input from the control unit 304. Specifically, the clutch actuator 346 moves the clutch operator 348 to a clutch disengagement or engagement position based on the fifth driving signal input from the control unit 304.

When the clutch operator 348 is moved to the disengagement position (e.g., pulled inward toward the robot 100), the clutch of the transmission is disengaged. When the clutch operator 348 is moved to the engagement position (e.g., released away from the robot 100), the clutch of the transmission is engaged. Further, when the clutch operator 348 is between a fully engaged position and a fully disengaged position, the clutch is in a partially engaged state.

In examples, the clutch actuator 346 may have a position sensor 352 configured to detect the operating position of the clutch operator 348. The position sensor 352 is configured to output a detection signal indicating the position of the clutch operator 348 to the control unit 304. The control unit 304 may use this signal to control the position of the clutch operator 348, and thus control the engagement and disengagement of the transmission clutch.

As shown in FIG. 3A, the right foot 110 is coupled to the distal end of the right leg 106. Specifically, the right foot 110 is rotatably coupled to the right leg 106 and is configured to pivot about an ankle 354. The right foot 110 is configured to operate a second brake operator 356 (e.g., rear-brake pedal) of the motorcycle 200. Specifically, the robot 100 may have a second brake actuator 358 that is coupled to the right leg 106 and is configured to operate the second brake operator 356 via the right foot 110.

The second brake actuator 358 could be, for example, a hydraulic or pneumatic cylinder. As the cylinder extends and retracts, the right foot 110 rotates about the ankle 354. In another example, the second brake actuator 358 may include an electric linear motor. In another example, the second brake actuator 358 may be coupled to the right foot 110 via a link member 359. The link member 359 may include a wire or string (e.g., the twisted string 606 described below with respect to FIGS. 6A-6B) attached to the right foot 110 such that the second brake actuator 358 could move the right foot 110 via the link member 359. Any other actuation mechanism could be used.

The second brake actuator 358 may be configured to operate the second brake operator 356 in response to a sixth driving signal input from the control unit 304. For example, if the sixth driving signal is a command to actuate the rear brakes of the motorcycle 200, the second brake actuator 358 may, in response to the command, push the second brake operator 356 downward to apply, or increase, a braking force to the rear wheel 202. The second brake actuator 358 may then release the second brake operator 356 to pull it upward and release the rear brakes. The braking and releasing directions mentioned here are examples for illustration and could be reversed.

The second brake actuator 358 may include a torque sensor 360 configured to provide to the control unit 304 sensor information indicative of a torque applied to the second brake operator 356 via the second brake actuator 358. The higher the torque applied to the second brake operator 356, the larger the braking force applied to the rear brakes.

Referring to FIG. 3B, the rear portion of the body frame 302 includes a seating member 362. The seating member 362 is attached to the driver's seat 212 by, for example, bolts or other fasteners. The seating member 362 may be configured to accommodate forces applied to the robot 100 due, for example, to vibration or air resistance or the like to keep the robot 100 seated while operating the motorcycle 200. In this manner, the robot 100 may be capable of accurately operating the motorcycle 200 based on commands or signals from the control unit 304. Additionally or alternatively, the robot 100 may remain seated and resist disturbance forces by holding on the motorcycle 200 via the left and right hands 116 and 118, and the left and right legs 104 and 106.

Referring back to FIG. 3A, the robot 100 may include an imaging device 364. The imaging device 364 could be, for example, a camera, a Light Detection And Ranging (LI-DAR) device, a Radio Detection And Ranging (RADAR) device, or any type of imaging devices, or a combination thereof.

In examples, the imaging device 364 may be mounted to the head 120 of the robot 100. In other examples, the imaging device 364 may be coupled to the motorcycle 200. The imaging device 364 is configured to capture images of, and generate image data representing, an environment of the robot 100 and the motorcycle 200. The imaging device 364 outputs the generated image data to the control unit 304 to enable the control unit 304 to control the robot 100 and/or the motorcycle 200 accordingly.

In examples, the control unit 304 may transmit the image data to a remote control device. A human operator may be operating the robot 100 and the motorcycle 200 via the remote control device, and the human operator may thus have access to images of the surrounding environment of the robot 100 and the motorcycle 200. The image data may enable the human operator to operate the robot 100 and the motorcycle 200 in a safe and accurate manner. Alternatively, the imaging device 364 may be in direct wireless communication with the remote control device and may be configured to transmit the inage data directly to the remote control device.

The robot 100 may include a roll angle sensor 366. The roll angle sensor 366 may, for example, be coupled to the main body 102 of the robot 100. However, the roll angle sensor 366 may be coupled to other parts of the robot 100 such as the head 120. Alternatively, the roll angle sensor 366 may be coupled to the motorcycle 200.

The roll angle sensor 366 may include, for example, an inertial measurement unit (IMU) configured to detect left and right roll angles of the motorcycle 200. Alternatively, the roll angle sensor 366 may include other types of sensors (e.g., optical sensors) that are configured to detect the roll angles. The roll angle sensor 366 is configured to output a detection signal indicating the roll angle of the motorcycle 200 to the control unit 304.

The robot 100 may further include an antenna 368 that may, for example, be coupled to the main body 102 of the robot 100. However, the antenna 368 may be attached to other parts of the robot 100 such as the head 120. Alternatively, the antenna 368 may be attached to the motorcycle 200. The antenna 368 may be configured to receive operating signals from the above-mentioned remote control device, as described below with respect to FIG. 7. The antenna 368 may be configured to provide the operating signals to the control unit 304. Further, the control unit 304 may transmit information (e.g., commands, sensor information, etc.) to the remote control device via the antenna 368.

As shown in FIG. 3A, the control unit 304 may include a main controller 370. The main controller 370 may, for example, include a processor (e.g., a general purpose processor or a special purpose processor such as a digital signal processor, a graphics processor, or an application specific integrated circuit processor). The processor can be configured to execute computer-readable program instructions. The processor can be configured to execute hard-coded functionality in addition to or as an alternative to software-coded functionality. The processor can be programmed to perform any function or combination of functions described herein as being performed by the main controller 370 or the control unit 304.

The control unit 304 may further include a memory or any type of data storage device storing program instructions that, when executed by the main controller 370, enable the robot 100 and/or the motorcycle 200 to operate as described herein. The data storage device could include a non-transitory computer-readable medium, a transitory computer-readable medium, or both a non-transitory computer-readable medium and a transitory computer-readable medium. In one respect, a non-transitory computer-readable medium could be integrated in whole or in part with the main controller 370. In another respect, a non-transitory computer-readable medium, or a portion thereof, could be separate and distinct from the main controller 370.

A non-transitory computer-readable medium could include, for example, a volatile or non-volatile storage component, such as an optical, magnetic, organic or other memory or disc storage. Additionally or alternatively, a non-transitory computer-readable medium could include, for example, a random-access memory (RAM), a read-only memory (ROM), a programmable read-only memory (PROM), an erasable programmable read-only memory (EPROM), an electrically erasable programmable read-only memory (EEPROM), a compact disk read-only memory (CD-ROM), or another memory device that is configured to provide data or computer readable program instructions to the main controller 370.

The control unit 304 may further include actuator control modules configured to operate various actuators of the robot 100 and the motorcycle 200. For instance, the control unit 304 may include: an accelerator module 372 configured to control the accelerator actuator 318, a first brake module 374 configured to control the first brake actuator 326, a second brake module 376 configured to control the second (rear) brake actuator 358, a steering module 378 configured to control the steering actuator 322, a clutch module 380 configured to control the clutch actuator 346, a shifter module 382 configured to control the shift actuator 342, and an outrigger module 384 configured to control outrigger actuators described below. The control unit 304 and these actuator control modules are described below with respect to FIG. 7.

III. EXAMPLE ROLLIN STABILIZATION SYSTEMS (OUTRIGGER SYSTEMS)

Figure 4A:
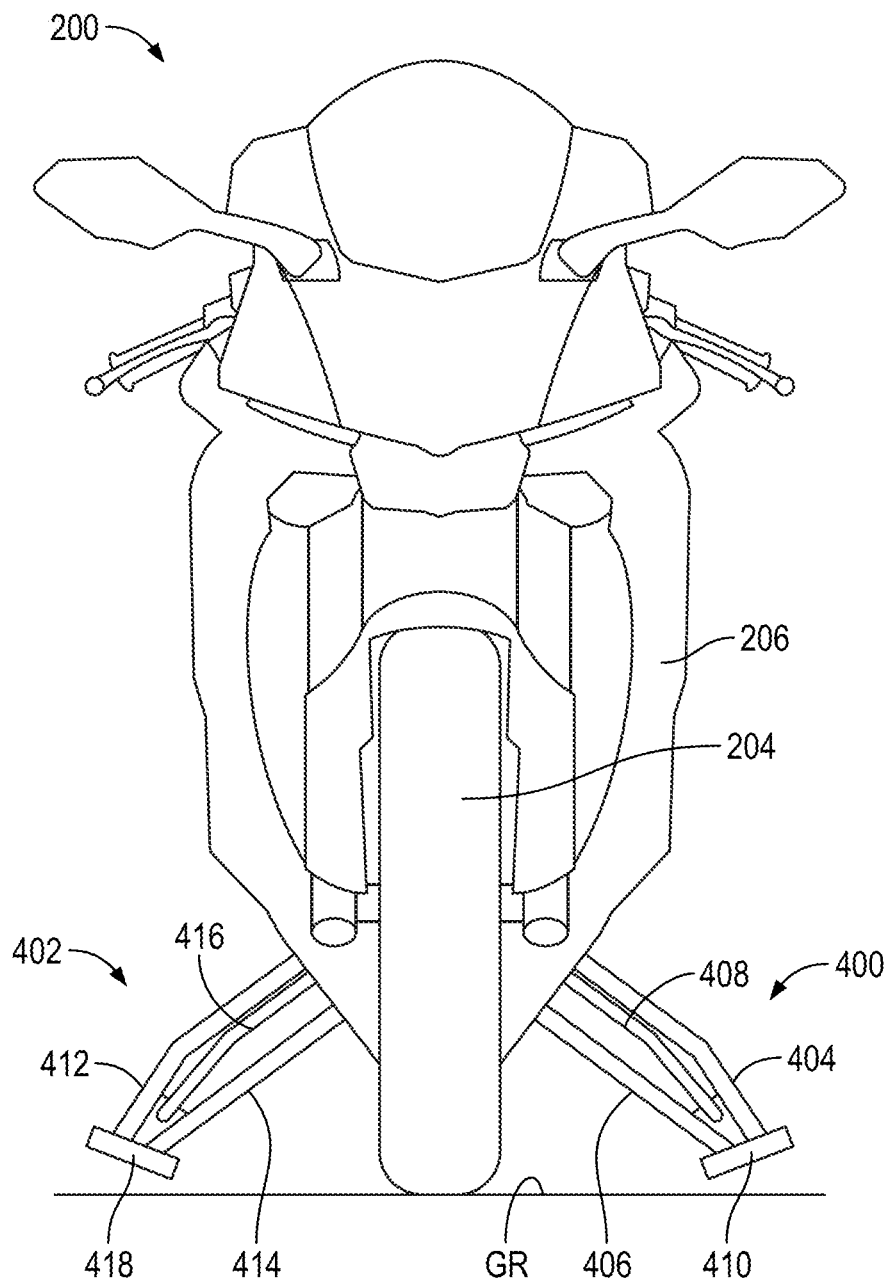
FIG. 4A illustrates a front view of a motorcycle showing left and right outriggers, in accordance with an example implementation.

FIG. 4A illustrates a front view of the motorcycle 200 showing outriggers 400 and 402, in accordance with an example implementation. As mentioned above, the motorcycle 200 is used herein as an example for illustration. The outriggers 400 and 402 described below could be used with any other type of vehicle that is laterally unstable when stopped.

As shown in FIG. 4A, the left outrigger 400 has a first supporting member 404, a second supporting member 406, and a deployment or expansion member 408. Tips or distal ends of the first supporting member 404, the second supporting member 406, and the expansion member 408 are connected to each other by a pad 410.

Similarly, the right outrigger 402 has and a first supporting member 412, a second supporting member 414, and a deployment or expansion member 416. Tips or distal ends of the first support member 412, the second supporting member 414, and the expansion member 416 are connected to each other by a pad 418. Proximal ends of the supporting members 404-406 and the expansion member 408 are rotatably coupled to the motorcycle at respective pivots as shown and described below with respect to FIG. 4B.

As shown in FIG. 2, the outriggers 402 (and also the outrigger 400 not shown in FIG. 2) are in an undeployed, e.g., retracted state, and thus they are arranged along the sides of the vehicle body 206. In other examples, the outrigger 402 could be arranged underneath the motorcycle 200 while in the undeployed state. The outrigger 402 could be arranged in other positions or configurations in the undeployed state such that it does not impede leaning of the motorcycle 200. In this undeployed state, the pad 418 is located above the bottom of the vehicle body 206. As shown in FIG. 4A, the outriggers 400 and 402 are in a deployed state, and thus they are widened in the lateral direction of the motorcycle 200. In this deployed state, the ground pads 410 and 418 are disposed below the bottom of the vehicle body 206. Particularly, in a state where the motorcycle 200 is upright in the vertical direction as shown in FIG. 4A, the pads 410 and 418 do not contact the ground surface (GR), but are instead set at a particular height above the ground surface (GR). In this way, the outriggers 400 and 402 can be deployed even if the motorcycle 200 is tilted slightly to the left or right direction with respect to the vertical direction.

However, if the motorcycle 200 is tilted by a predetermined angle with respect to the vertical direction, one of the left and right pads 410 and 418 comes in contact with the ground surface (GR). The outrigger in contact with the ground surface (GR) can support the motorcycle 200 so as to laterally stabilize the motorcycle 200 and prevent it from falling.

Figure 4B:
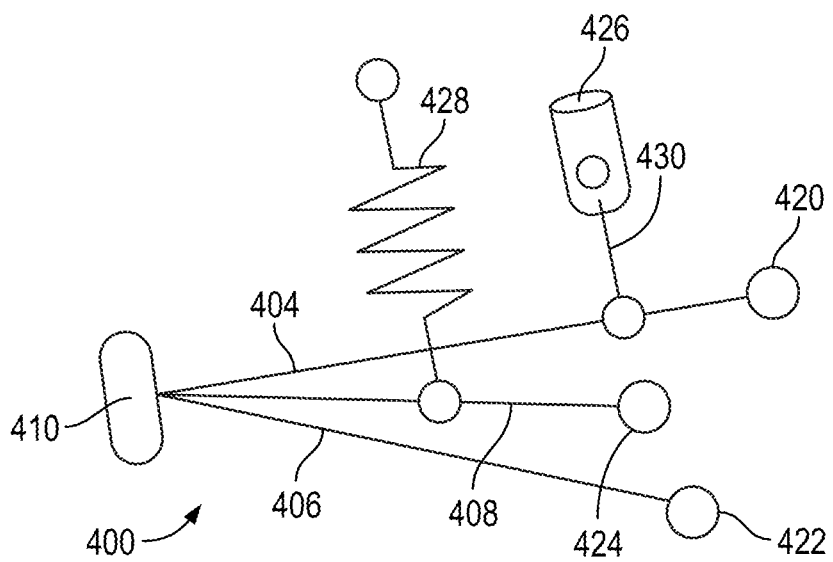
FIG. 4B illustrates a schematic diagram of a left outrigger, in accordance with an example implementation.

FIG. 4B illustrates a schematic diagram of the left outrigger 400, in accordance with an example implementation. As shown schematically in FIG. 4B, the first supporting member 404 is rotatably coupled to the motorcycle at a pivot 420, the second supporting member 406 is rotatably coupled to the motorcycle at a pivot 422, and the expansion member 408 is rotatably coupled to the motorcycle at a pivot 424.

An outrigger actuator 426 is coupled to, and configured to operate, the outrigger 400. The outrigger actuator 426 could be, for example, a hydraulic cylinder, an electric linear motor, or a pneumatic cylinder among other possible actuator types. Particularly, the outrigger actuator 426 may be coupled to the first supporting member 404, but could be coupled to other members or parts of the outrigger 400 in other example implementations.

The outrigger actuator 426 may operate the outrigger 400 based on a seventh driving signal input from the control unit 304. For instance, if the seventh driving signal from the control unit 304 is a command to actuate the outrigger 400, the outrigger actuator 426 may receive the signal and responsively move the outrigger 400 from the undeployed state to the deployed state.

In an example, the outrigger 400 may be biased by a biasing member 428 (e.g., a spring) coupled to the expansion member 408. The biasing member 428 may be configured to bias the outrigger 400 toward the deployed state. A limiting or holding member 430 may couple the outrigger actuator 426 to the outrigger 400 (e.g., to the first supporting member 404) and may be configured to hold the outrigger 400 in the undeployed state against the biasing force of the biasing member 428.

When the outrigger actuator 426 is triggered, the holding member 430 is released, and the biasing force of the biasing member 428 pushes the outrigger 400 downward, thus switching the outrigger 400 from the undeployed state to the deployed state. The right outrigger 402 may be configured to operate similar to the left outrigger 400.

Figure 4C:
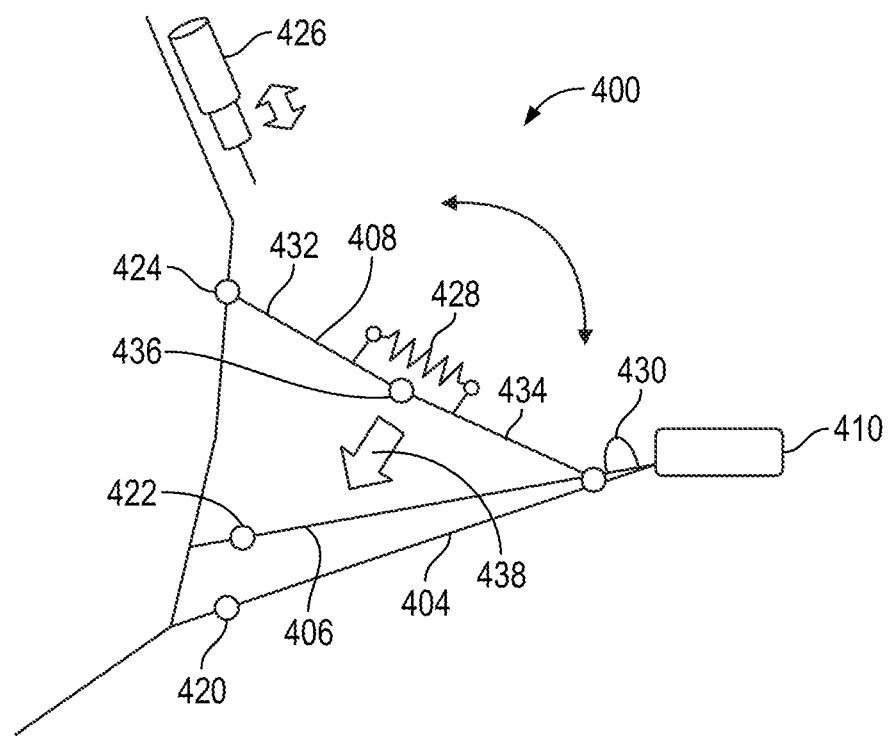
FIG. 4C illustrates an alternative configuration of an outrigger, in accordance with an example implementation.

FIG. 4C illustrates an alternative configuration of the outrigger 400, in accordance with an example implementation. In FIG. 4C, the expansion member 408 includes a first expansion link 432, a second expansion link 434, and a pivot 436. The biasing member 428 applies a biasing force that tends to bias the second expansion link 434 away from the first expansion link 432. When the outrigger actuator 426 is triggered and the holding member 430 is released, the biasing member 428 pushes the second expansion link 434, which pivots about the pivot 436 placing the outrigger 400 in the deployed state. By pushing down on the pivot 436 in a direction of arrow 438, the holding member 430 is connected again with the outrigger actuator 426 as the expansion member 408 folds and the outrigger 400 switches back from the deployed state to the undeployed state.

Figure 4D:
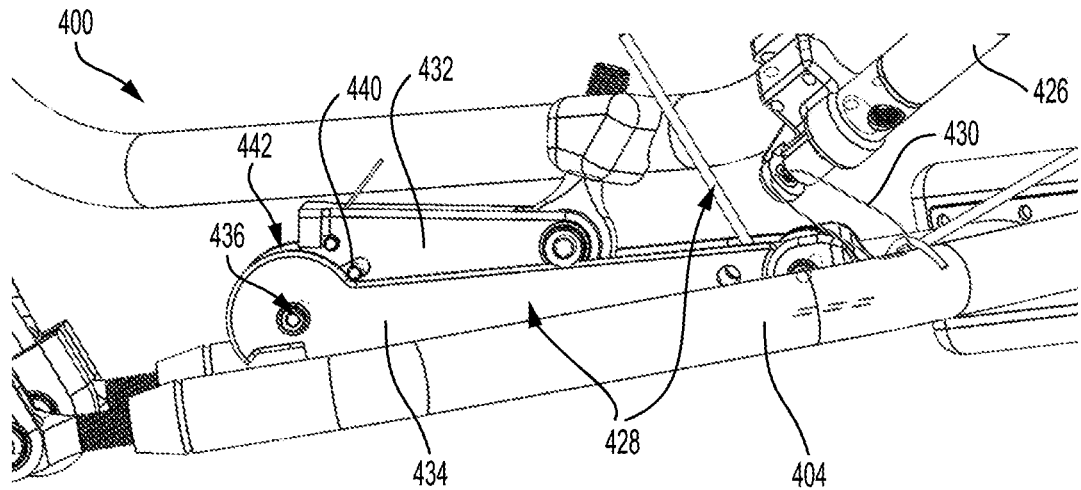
FIG. 4D illustrates a perspective view of the outrigger shown in FIG. 4C in a undeployed state, in accordance with an example implementation.
Figure 4E:
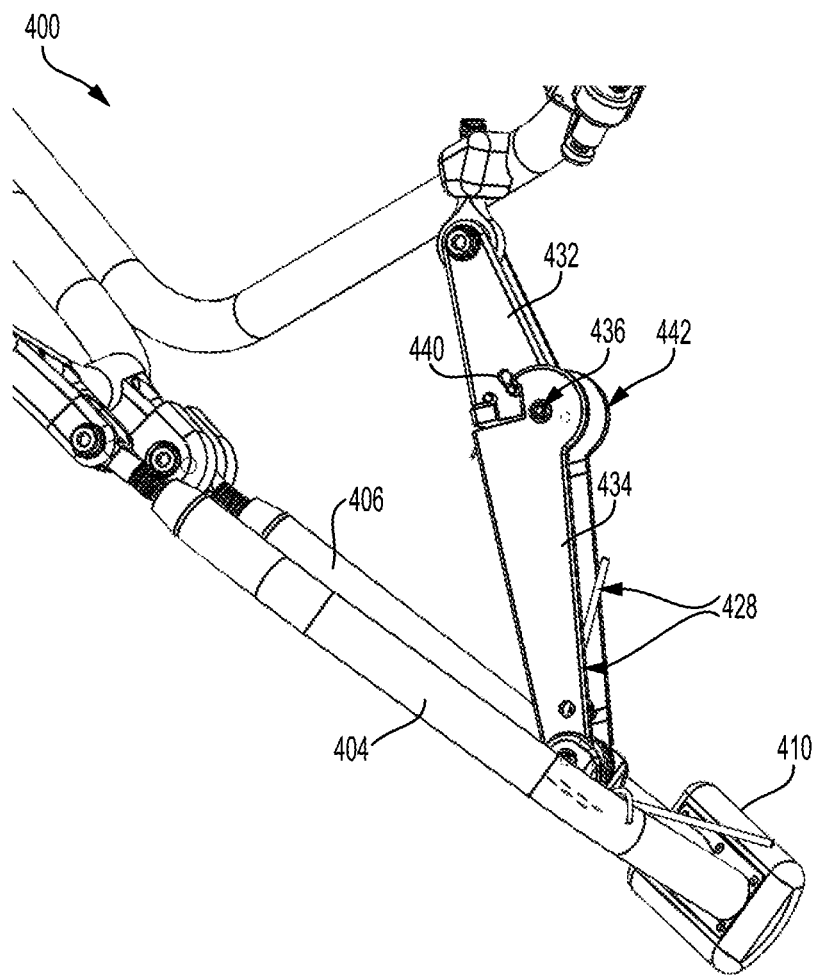
FIG. 4E illustrates a perspective view of the outrigger shown in FIG. 4C in a deployed state, in accordance with an example implementation.

FIG. 4D illustrates a perspective view of the outrigger 400 of FIG. 4C in an undeployed state, and FIG. 4E illustrates a perspective view of the outrigger 400 of FIG. 4C in a deployed state, in accordance with an example implementation. As shown in FIG. 4D, the holding member 430 takes the form of a wire loop that connects the outrigger actuator 426 to the first supporting member 404 of the outrigger 400. A wire loop is used herein as an example, and other techniques could be used to implement the operation of the holding member 430.

The expansion member 408 includes a deployment latch 440. The second expansion link 434 has a cam profile 442 configured to hold the deployment latch 440 in an open position when the outrigger 400 is in the undeployed state shown in FIG. 4D. The biasing member 428 takes the form of a torsion spring and a linear spring that could be embedded within structural members of the outrigger 400 (e.g., within the second expansion link 434). These springs are configured to apply a force and moment that tends to force the second expansion link 434 away from the first expansion link 432. However, the wire loop 430 prevents the second expansion link 434 from rotating about the pivot 436 and keeps the outrigger 400 in the undeployed state.

When the outrigger actuator 426 is triggered (e.g., a pneumatic cylinder is retracted), the wire loop 430 is released, and the biasing member 428 pushes the first and second expansion links 432 and 434 away from each other. Thus, the first and second expansion links 432 and 434 rotate relative to each other about the pivot 436 and the outrigger 400 switches to the deployed state shown in FIG. 4E. As illustrated in FIG. 4E, the deployment latch 440 closes, thus locking the second expansion link 434, and the first and second supporting members 404 and 406, in the expanded position. The outrigger 400 is thus deployed. The outrigger 402 may include similar components and operate similar to the outrigger 400.

Figure 4F:
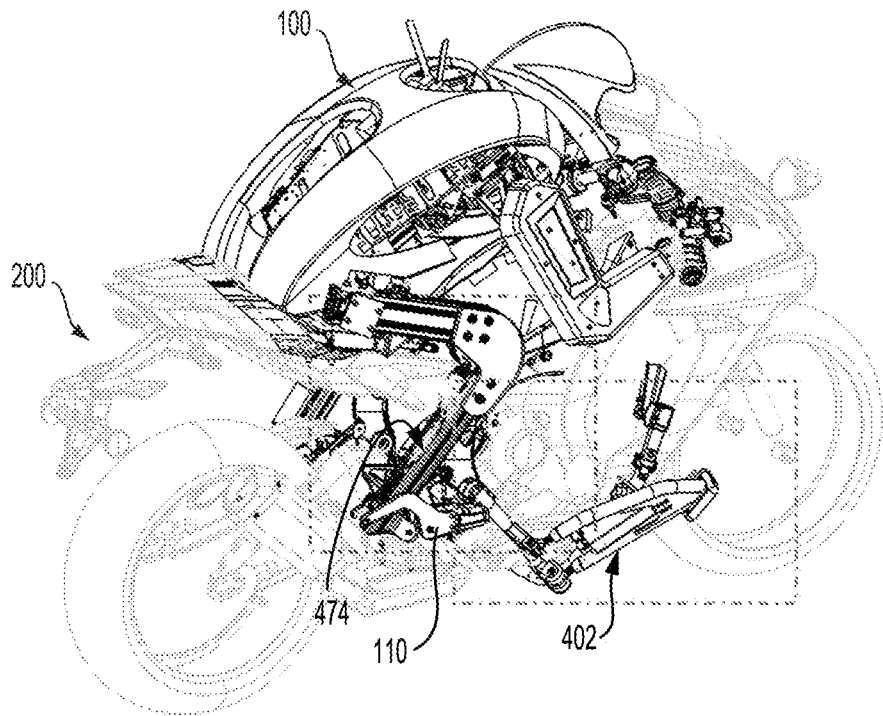
FIG. 4F illustrates a perspective view of a robot and a motorcycle showing mounting of a right outrigger to the motorcycle, in accordance with an example implementation.
Figure 4G:
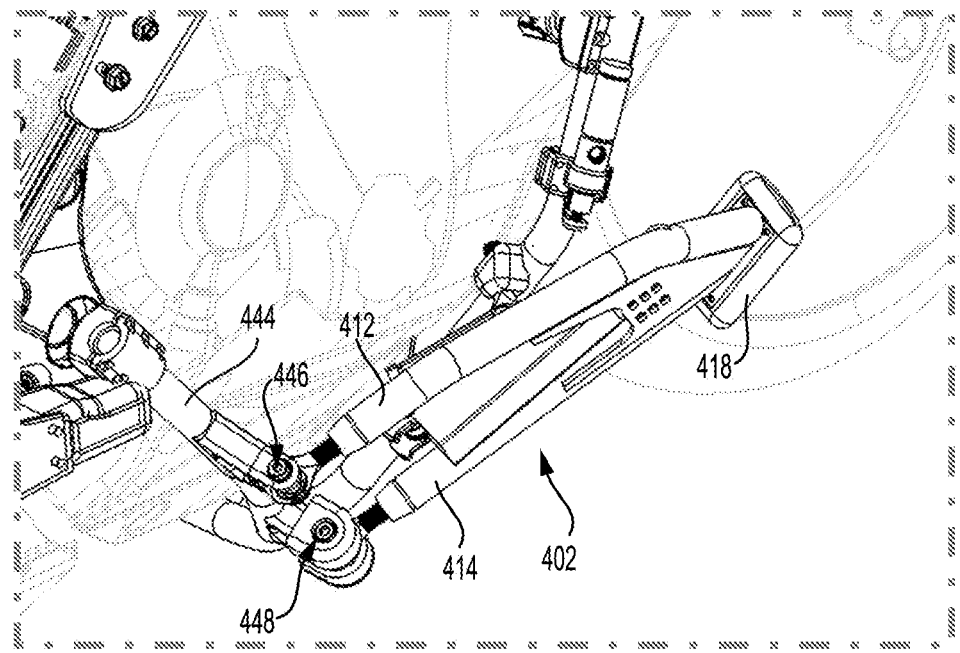
FIG. 4G illustrates a zoomed-in view of the outrigger shown in FIG. 4F, in accordance with an example implementation.

FIG. 4F illustrates a perspective view of the robot 100 and the motorcycle 200 showing mounting the outrigger 402 to the motorcycle 200, and FIG. 4G illustrates a zoomed-in view of the outrigger 402 as shown in FIG. 4F, in accordance with an example implementation. As shown in FIGS. 4F and 4Q the outrigger 402, and specifically, the first supporting member 412, may be mounted near a rear end of the motorcycle 200 by way of a swing arm 444 at a pivot 446. The second supporting member 414 may be rotatably coupled to the motorcycle 200 at a pivot 448. The outrigger 400 not shown in FIGS. 4F-4G may be similarly mounted to the motorcycle 200.

Although FIGS. 4F and 4G illustrate the outrigger 402 coupled to the motorcycle 200, in other example implementations the outriggers 400 and 402 could be coupled to the robot 100 instead. For example, the supporting members 412 and 414 and the expansion member 416 could be coupled to the right foot 110 of the robot 100.

Several conditions may lead to deployment of the outriggers 400-402. For example, the robot 100 and the motorcycle 200 may be controlled remotely by a remote control device operated by a human. The remote control device may have a button or a similar user interface item that, when pressed or selected, sends a signal to the control unit 304 commanding the motorcycle 200 to deploy the outriggers 400-402. In response, the control unit 304 may send a signal to one or more of the outrigger actuators (e.g., the outrigger actuator 426) to deploy the outriggers.

In another example, in the case of any type of emergency, the remote control device may have an emergency button that, when pressed or selected, an emergency signal is sent to the control unit 304 to deploy the outriggers 400-402. In another example, if the control unit 304 detects that a speed of the motorcycle 200 is less than a threshold speed (e.g., 5 miles per hour) that is insufficient to maintain the motorcycle 200 balanced, the control unit 304 may determine that such low speed indicates an emergency and deploys the outriggers 400-402 for safety reasons.

Figure 4H:
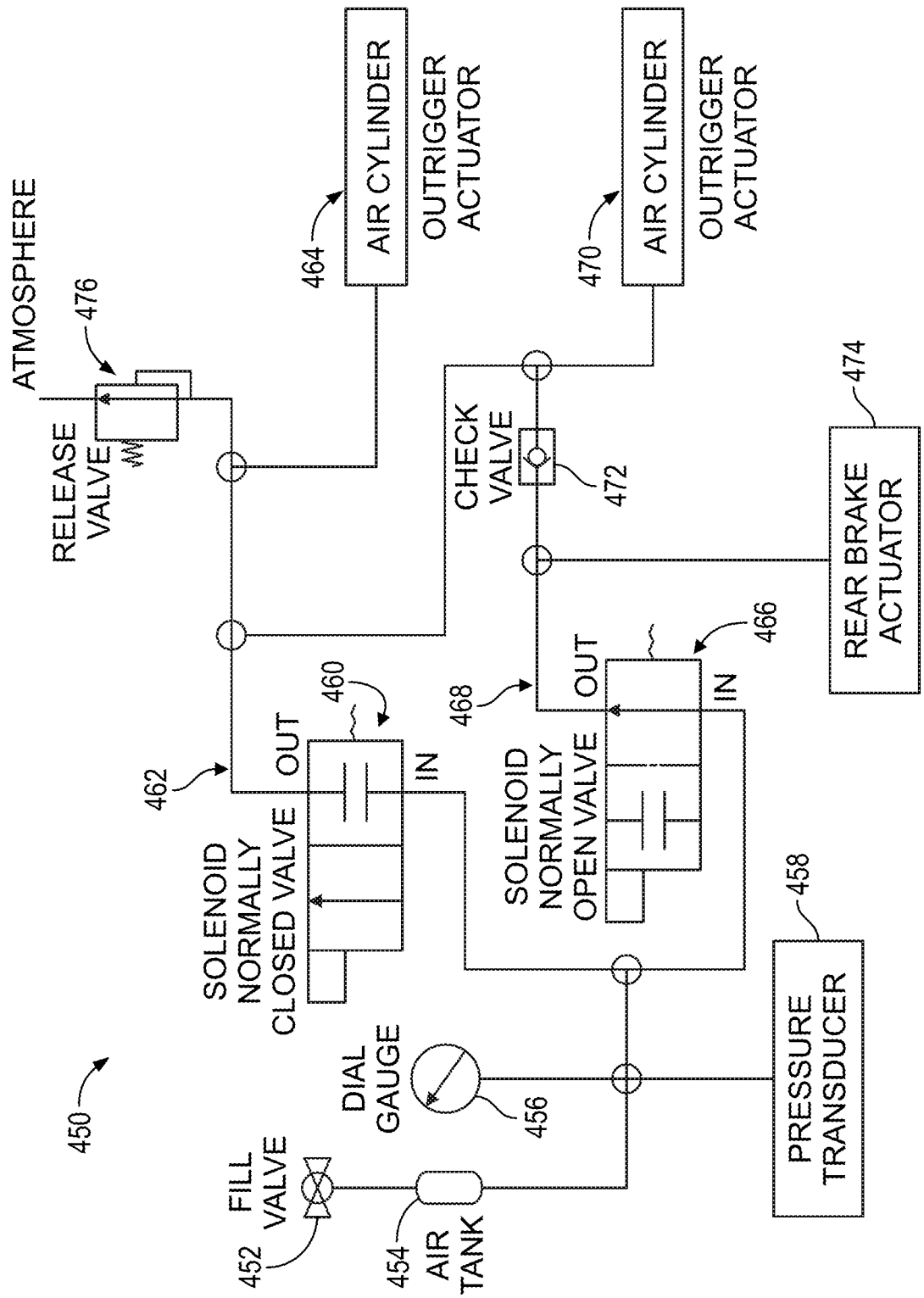
FIG. 4H illustrates a pneumatic circuit showing operation of outriggers under various scenarios, in accordance with an example implementation.

FIG. 4H illustrates a pneumatic circuit 450 showing operation of the outriggers 400-402 under various scenarios, in accordance with an example implementation. Although the circuit 450 represents a pneumatic system, a hydraulic system or other actuation mechanism could be used instead. Components of the circuit 450 may be coupled to the motorcycle 200 or the robot 100 or both.

The circuit 450 includes a fill valve 452 that, when opened, allows compressed air to fill an air tank 454 that operates as a source of pressurized fluid (i.e., pressurized air or gas in this case). A dial gauge 456 may visually indicate pressure level of the pressurized gas in the tank 454, and a pressure transducer 458 may be configured to provide a signal to the control unit 304 indicating the pressure level.

A first valve 460 is disposed in a first fluid path 462 between the tank 454 and air cylinders 464 and 470. The cylinder 464 may represent an outrigger actuator (e.g., the outrigger actuator 426) that when triggered, causes the corresponding outrigger (e.g., the outrigger 400) to deploy. The cylinder 470 may be the outrigger actuator corresponding to the other outrigger (e.g., the outrigger 402). Similarly, a second valve 466 is disposed in a second fluid path 468 between the tank 454 and the cylinders 464 and 470.

In an example, the first valve 460 may be a normally-closed valve that is electrically operated by a solenoid. Thus, the valve 460 blocks the first fluid path 462 from the tank 454 to the cylinders 464 and 470 until an electric signal is received from the control unit 304 to actuate the valve 460 and allow pressurized fluid to flow to the cylinders 464 and 470.

Also, in an example, the second valve 466 may be a normally-open valve that is electrically operated by a solenoid. Thus, the valve 466 remains open until an electric signal is received from the control unit 304 to close the valve 466, which results in blocking the second fluid path 468 to the cylinders 464 and 470. If a signal is continuously provided to the solenoid of the valve 466, the valve 466 remains closed, thus blocking the second fluid path 468 to the cylinders 464 and 470.

In an example operation of the circuit 450, the control unit 304 continuously provides a signal to the valve 466 so as to place the valve 466 in a closed state and block the second fluid path 468. However, in an emergency situation or when the speed of the motorcycle drops below a threshold speed, power or the signal to the valve 466 may be cut-off. As a result, the valve 466 switches to its normally-open state allowing pressurized fluid to flow through a check valve 472 to the cylinders 464 and 470, thus causing the outriggers to deploy.

Substantially simultaneously, pressurized fluid also flows to a rear brake actuator 474 mounted to the robot 100 (also illustrated in FIG. 4G). The rear brake actuator 474 may be configured to override the second brake actuator 358 of the motorcycle 200 and apply the rear brakes when power is cut off from the valve 466. Specifically, the rear brake actuator 474 may include a cylinder similar to the cylinders 464 and 470. When pressurized fluid flows to the cylinder of the actuator 474, the cylinder may retract, thus causing the right foot 110 to press the second brake operator 356.

In a non-emergency situation, i.e., during normal operation, the control unit 304 may receive a command from, for example, a remote control device, requesting deployment of the outriggers 400-402. In another example, the control unit 304 may automatically determine to deploy the outriggers. In these examples, the control unit 304 may send a signal to the valve 460, which is normally-closed, to actuate the valve 460 and switch it from the closed state to an open state. As a result, pressurized fluid is allowed to flow through the first fluid path 462 to the cylinders 464 and 470 to deploy the outriggers 400-402.

The circuit 450 may include a release valve 476 that is configured to release excess gas to the atmosphere to reduce pressure in the pneumatic system.

IV. EXAMPLE STEERING MECHANISM

The robot 100 has two arms 112 and 114 that may grip handles of the handlebar 308 of the motorcycle 200 so as to steer the motorcycle 200. In some examples, each of the two arms 112 and 114 may be controlled by a corresponding actuator mechanism. In alternative examples, the steering system uses an actuator mechanism configured to control both arms 112 and 114, as disclosed herein. The steering system disclosed herein further uses lightweight components and a fewer number of actuators to reduce weight and enable the robot 100 to mimic a human rider more accurately and provide more accurate feedback of dynamics of the motorcycle 200.

Figure 5A:
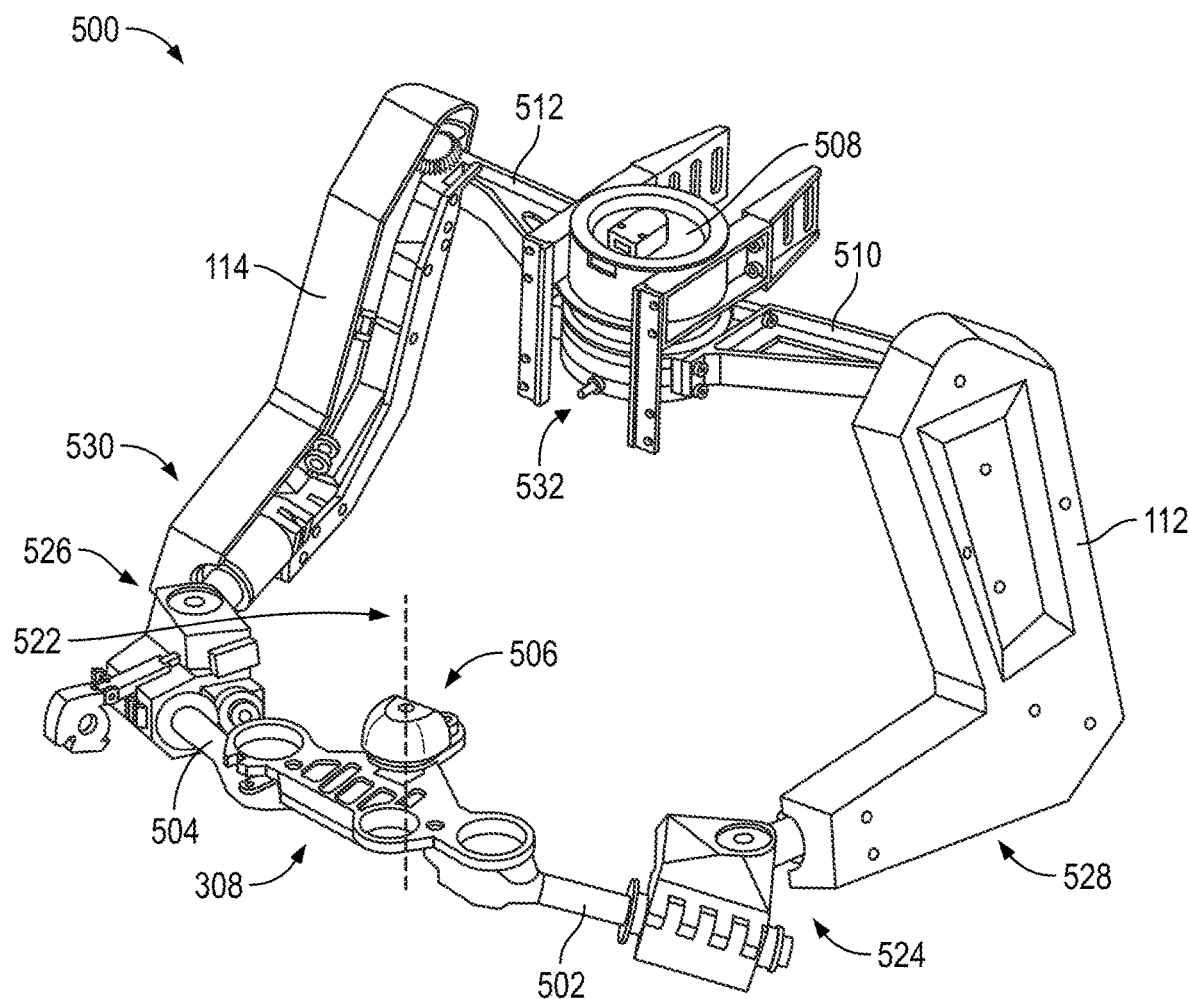
FIG. 5A illustrates a perspective view of a steering mechanism, in accordance with an example implementation.
Figure 5B:
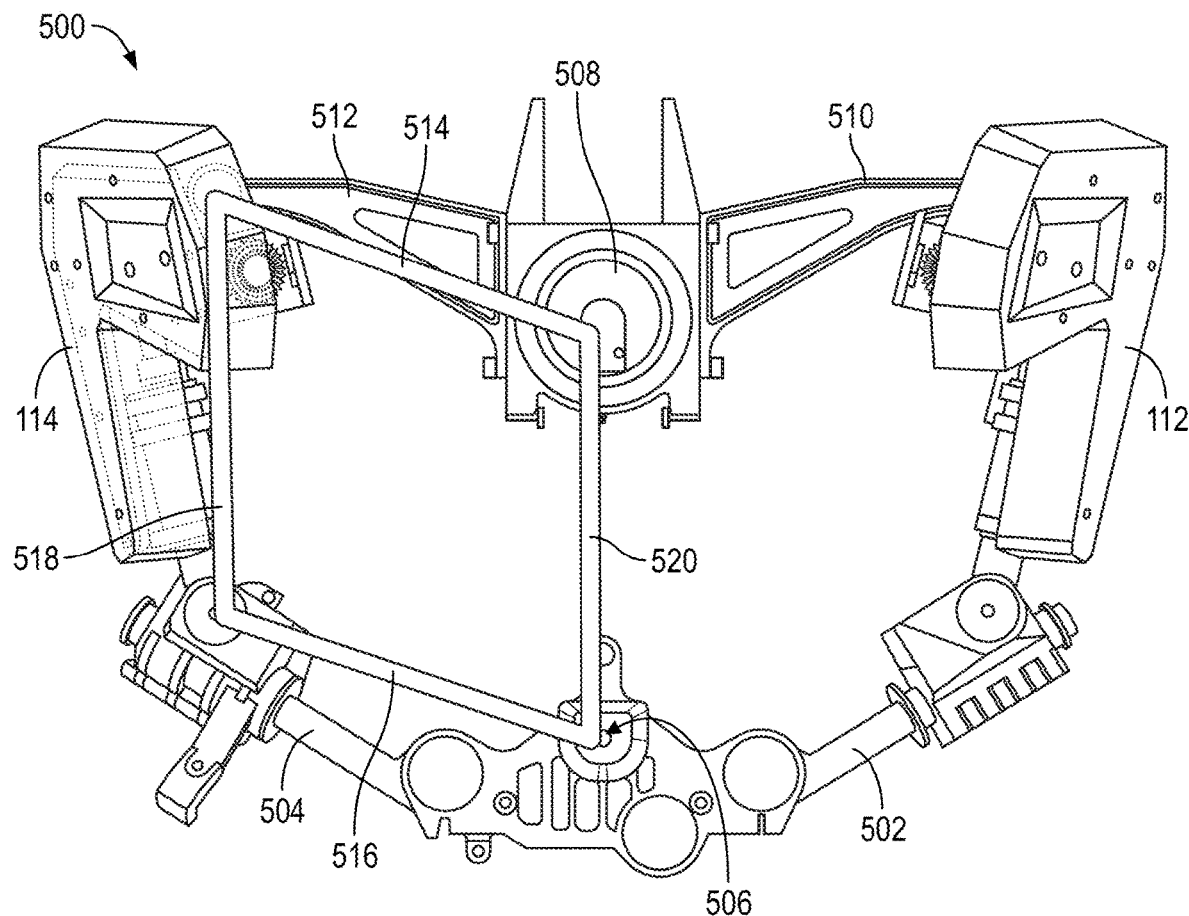
FIG. 5B illustrates a top view of the steering mechanism shown in FIG. 5A, in accordance with an example implementation.

FIG. 5A illustrates a perspective view of a steering mechanism 500, and FIG. 5B illustrates a top view of the steering mechanism 500, in accordance with an example implementation. The steering mechanism 500 includes the arms 112 and 114 of the robot 100 and left and right handlebars 502 and 504 composing the handlebar 308 of the motorcycle 200. The handlebars 502 and 504 are coupled to each other at, and are configured to rotate with respect to, a pivot 506.

As shown in FIGS. 5A-5B, a single rotary actuator 508 is used to control rotational angles of both handlebars 502 and 504 with respect to the pivot 506. The rotary actuator 508 corresponds to the steering actuator 322 mentioned above with respect to FIG. 3A. The rotary actuator 508 is connected or coupled to the left arm 112 via a first link 510, and connected or coupled to the right arm 114 via a second link 512.

As illustrated in FIG. 5B, the second link 512, the arm 114, and the handlebar 504 form a four-bar mechanism. In this four-bar mechanism, virtual bar 514 and virtual bar 516 are parallel and equal in length, and similarly, virtual bar 518 and virtual bar 520 are parallel and equal in length. A similar four-bar mechanism exists for the left side of the robot 100 and is not shown in FIG. 5B to reduce visual clutter in the drawing. The two four-bar mechanisms are symmetric with respect to each other, e.g., symmetric about a virtual line connecting a center of the rotary actuator 508 and a center of the pivot 506.

In an example, the geometry of linkages of the four-bar mechanism (i.e., geometry of the link 512, the arm 114, and the handlebar 504) is such that there is a 1:1 ratio between a rotary angle of the rotary actuator 508 and respective angles of the handlebars 502 and 504 with respect to the pivot 506. Thus, a 1:1 ratio exists between the rotary angle of the rotary actuator 508 and a steering angle of the motorcycle 200.

This configuration permits the steering torque load on the handlebars 502 and 504 to be shared between both sets of linkages of the four-bar mechanisms while still allowing free movement of the handlebars 502 and 504. Further, the 1:1 ratio simplifies steering control as the steering angle is the same as the angle of the rotary actuator.

An advantage of controlling steering with the two arms 112 and 114 over using one arm is that the load on the handlebars 502 and 504 is balanced. A one-armed steering system would experience a net force of torque over an arm, whereas the two-arm steering system may experience no additional net force while turning because the loads on the arms 112 and 114 cancel each other. Thus, as a result of using the steering system 500, the force that supports the steering rotary actuator 508 can be lower, and therefore a lighter supporting structure can be used.

Further, the steering mechanism 500 can accommodate horizontal displacements of the rotary actuator 508 or manufacturing misalignments/inaccuracies in positioning the rotary actuator 508 with respect to an axis 522 (shown in FIG. 5A) of the pivot 506. This accommodation results from spatial constraints placed on the rotary actuator 508 by the linkages of the above mentioned four-bar mechanisms. As such, manufacturing cost of the components of the steering system 500 may be reduced because high precision manufacturing cost is alleviated.

In an example, standard planar pin joints may be located at vertices of the four-bar mechanisms (e.g., vertices of the four-bar mechanism illustrated by the virtual bars 514-520 in FIG. 5B). Additionally, a passive rotational degree of freedom about an axis along the length of the arms 112 and 114 may be included. This could be achieved with a rotary bearing located at the end of the forearm before the wrist. For instance, the rotary bearings could be placed at locations 524 and 526 shown in FIG. 5A. This allows for some misalignment of the components without the actuator steering mechanism 500 binding under motion.

Further, in examples, each of the arms 112 and 114 may include a linear force sensor. The linear force sensors may be placed in various locations. For instance, the linear force sensors may be placed along a length of forearms 528 and 530 shown in FIG. 5A.

The overall force applied to the handlebars 502 and 504 may be determined by the difference between force measurements obtained by the two linear force sensors. For example, if the overall force is zero, then no torque is being applied to the handlebars 502 and 504 by the steering mechanism 500. In examples, to accurately compute torque from the linear force sensors, angles at the wrists may be taken into consideration and rotary position sensors may added at the locations 524 and 526 to determine these angles.

In an example, a torque sensor 532 may be mounted to the rotary actuator 508 to provide redundant torque sensing. The torque sensor 532 corresponds to the torque sensor 324 mentioned above with respect to FIG. 3A. Further, angular position sensors may be mounted to the rotary actuator 508 and/or the pivot 506 to provide redundant rotary position sensing.

In operation, the steering mechanism 500 may receive position and torque commands from the control unit 304. The control unit 304 may include a dynamic model of the motorcycle 200 and receive inputs from the sensors coupled to the robot 100 and the motorcycle 200. For instance, the control unit 304 may receive sensor information indicative of velocity, lean angle, heading of the motorcycle 200, and the status of the various actuators. Based on this information, the control unit 304 may determine outputs or commands to the actuators that operate the motorcycle 200 to control throttle, clutch, shifter, steering etc. and keep the motorcycle 200 moving at the desired velocity and trajectory. The steering mechanism 500 may receive a torque and rotary position or steering angle input command from the control unit 304, and the rotary actuator 508 accordingly rotates to achieve the commanded torque and steering angle.

Although the implementation shown in FIGS. 5A-5B includes a rotary actuator, other types of actuators could be used. For example, a linear actuator, such as a hydraulic cylinder, a pneumatic cylinder, or an electric linear motor, could be used instead. A first end of the linear actuator could be coupled to the first link 510 and a second of the linear actuator could be coupled to the second link 512. In this configuration, a linear position of the linear actuator (e.g., linear position of a piston within a hydraulic cylinder) determines the angles that the first handlebar 502 and the second handlebar 504 make relative to the pivot 506 and thus the steering angle.

Further, although the configuration shown in FIGS. 5A and 5B includes a handlebar divided into two handlebars 502 and 504 coupled via the pivot 506, in other examples, a single undivided handlebar could be used. The left arm 112 would be coupled to a first end of the handlebar and the right arm 114 would be coupled to a second end of the handlebar. In this case, the first link 510, the left arm 112, and a portion of the handlebar form the first four-bar mechanism, whereas the second link 512, the right arm 114, and another portion of the handlebar form the second four-bar mechanism.

V. EXAMPLE TWISTED STRING ACTUATORS

As mentioned above, the link members 330, 343, 350, and 359 could be twisted strings. These twisted strings change their length and apply a force when twisted by a corresponding actuator, i.e., the actuators 326, 342, 346, and 358, respectively. This section of the disclosure describes components and operation of an example twisted string actuator that includes a rotary actuator and a twisted string coupled thereto.

FIG. 6A illustrates a twisted string actuator (TSA) 600, and FIG. 6B illustrates a close-up, cutaway view of elements of the TSA 600, in accordance with an example implementation. The TSA 600 includes an actuator head 602, a transmission tube 604, and a twisted string 606. The twisted string 606 could represent any of the link members 330, 343, 350, or 359, for example.

A first end 608 of the twisted string 606 is rigidly connected to a plate 610 such that both torques and forces transmitted through the twisted string 606 are transmitted to the plate 610. The plate 610 could represent any of the operators 328, 338, 348, or 356 mentioned above. Thus, forces through and changes in length of the twisted string 606 induced by operation of a corresponding actuator 326, 342, 346, or 358 may result in application of force to and motion of the operators 328, 338, 348, or 356.

A second end 612 (shown in FIG. 6B) of the twisted string 606, is attached to a rotor or other component of the actuator head 602. In this manner, forces transmitted through the twisted string 606 are transmitted between the plate 610 and the actuator head 602.

The TSA 600 can be operated to produce a force and/or induce a displacement between the actuator head 602 and the plate 610 by applying a torque and/or rotation to the second end 612 of the twisted string 606. This force and/or displacement could cause a corresponding operator to move and/or to apply a force and/or torque. Additionally or alternatively, the TSA 600 could be actuated to reduce a force between the actuator head 602 and the plate 610 by reducing, removing, or otherwise changing a torque applied to the second end 612 of the twisted string 606.

The transmission tube 604 is illustrated as a single, straight, rigid tube; however, in other examples, the transmission tube 604 could be curved, serpentine, or have some other shape. Additionally or alternatively, the transmission tube 604 could be flexible. In some examples, the transmission tube 604 could withstand longitudinal forces while allowing the transmission tube 604 to be bent, for example, around a joint that flexes during operation of the TSA 600. That is, the transmission tube 604 and the twisted string 606 partially contained therein could be configured analogously to the outer housing and inner cable, respectively, of a Bowden cable.

Further, the transmission tube 604 could be configured to be adjustable, such that properties of the TSA 600 are adjustable. For example, the transmission tube 604 could include lockable and/or actuated telescoping elements such that the overall length of the transmission tube 604 (i.e., the length between the actuator head 602 and the end of the transmission tube 604 from which the twisted string 606 emerges) could be changed and/or controlled to control a range-of-motion, a transmission ratio, or some other property of the TSA 600.

As shown in FIG. 6B, the TSA 600 includes a housing 614 that contains part of the transmission tube 614, part of the twisted string 606 (including first and second strands 606a and 606b), a load cell and encoder 616, a thrust bearing 618, a transmission block 620, a slip clutch 622, and a motor 624.

The housing 614, the transmission tube 604, the load cell and encoder 616, stator elements of the thrust bearing 618, and stator elements of the motor 624 are rigidly mechanically coupled. The second end 612 of the twisted string 606, the transmission block 620, and a first end of the slip clutch 622 are rigidly mechanically connected. A second end of the slip clutch 622 and rotor elements of the motor 624 are rigidly connected.

The motor 624 could be operated to generate a torque between the housing 614 and the second end of the slip clutch 622. This torque could be transmitted through the slip clutch 622 and the transmission block 620 to the twisted string 606, resulting in the TSA 600 applying a torque and/or force between the actuator head 602 and the plate 610. Further, this torque causes the twisted string 606 to change its length resulting in displacement between the actuator head 602 and the plate 610.

The slip clutch 622 could be configured such that the torque transferred between the motor 624 and the transmission block 620 does not exceed a specified torque level. The specified torque level could be chosen or set such that a force applied between the actuator head 602 and the plate 610 by TSA 600 does not exceed a specified force level. The specified force level could be related to the specified torque level and a transmission ratio of the TSA 600 related to the length of the twisted string 606 and the pitch of the twist of the strands 606a, 606b of the twisted string 606.

The load cell and encoder 616 is configured to measure the force transmitted through, and the rotation of, the second end 612 of the twisted string 606. The load cell could include piezoelectric elements, strain gauges, or other elements configured to transduce the force transmitted from the second end 612 of the twisted string 606 into the transmission tube 604 and actuator head 602 into a signal or value indicating the transmitted force. The encoder could include optical or other elements capable of measuring the absolute and/or relative rotation of the second end 612 of the twisted string 606 directly and/or indirectly (e.g., by detecting absolute or relative rotation of the transmission block 620, twisted string 606, and/or a rotor of the thrust bearing 618).

Information from the load cell and encoder 616 could be used to operate the TSA 600, for example, using closed-loop feedback control. For instance, the control unit 304 of the robot 100 could operate the motor 624 based on forces and/or rotations detected using the load cell and encoder 616 to generate a constant force in the twisted string 606, a constant rotation of the second end 612 of the twisted string 606, or a specific change in a length of the twisted string 606.

Additionally or alternatively, the control unit 304 could be configured to derive other detectable parameters of the TSA 600 and/or plate 610. For example, the control unit 304 could be configured to determine a rotation rate of the second end 612 of the twisted string 606 corresponding to a specified rate of linear displacement between the actuator head 602 and the plate 610 based on a stored, known, or otherwise determined current length and/or level of twist of the twisted string 606. The control unit 304 could then operate the TSA 600 to achieve the specified rate of linear displacement by operating the motor 624 to achieve the rotation rate corresponding to the rate of linear displacement.

Properties of the twisted string 606 and of the individual strands 606a, 606b of the twisted string 606 could be specified to satisfy some constraint(s) and/or to have some property(s) according to an application. For example, a diameter and composition of the strands 606a, 606b could be chosen such that the twisted string 606 has a specified strength, fatigue resistance, transmission ratio, compliance, or some other property or properties. In some examples, the strands 606a, 606b of the twisted string 606 could be wholly or partially composed of ultra-high-molecular-weight polyethylene or some other high strength, low bending radius, low internal friction, high stiffness material.

The TSA 600 could include a string having two strands, like the strands 606a, 606b, or could include more than two strands. The arrangement of the two or more strands could be controlled and/or specified. In some examples, the arrangement of the two or more strands could be controlled by the configuration of the transmission block 620 or by the way in which ends of the strands opposite the transmission block 620 are attached to each other and/or to an actuated element.

The TSA 600 shown in FIGS. 6A-6B is one implementation of a twisted string actuator as described herein. Other configurations of TSAs, including alternate, additional, fewer, and/or differently configured components are anticipated. A TSA could include multiple twisted strings, different number(s) of strands, multiple motors, twisted strings actuated by two rotational actuators (i.e., a rotational actuator coupled to each end of the twisted string), more than one transmission tube, differently configured transmission tubes, different locations and/or means of attachment to actuated elements, or other configurations according to an application.

VI. EXAMPLE ROBOT CONTROL SYSTEM

Figure 7:
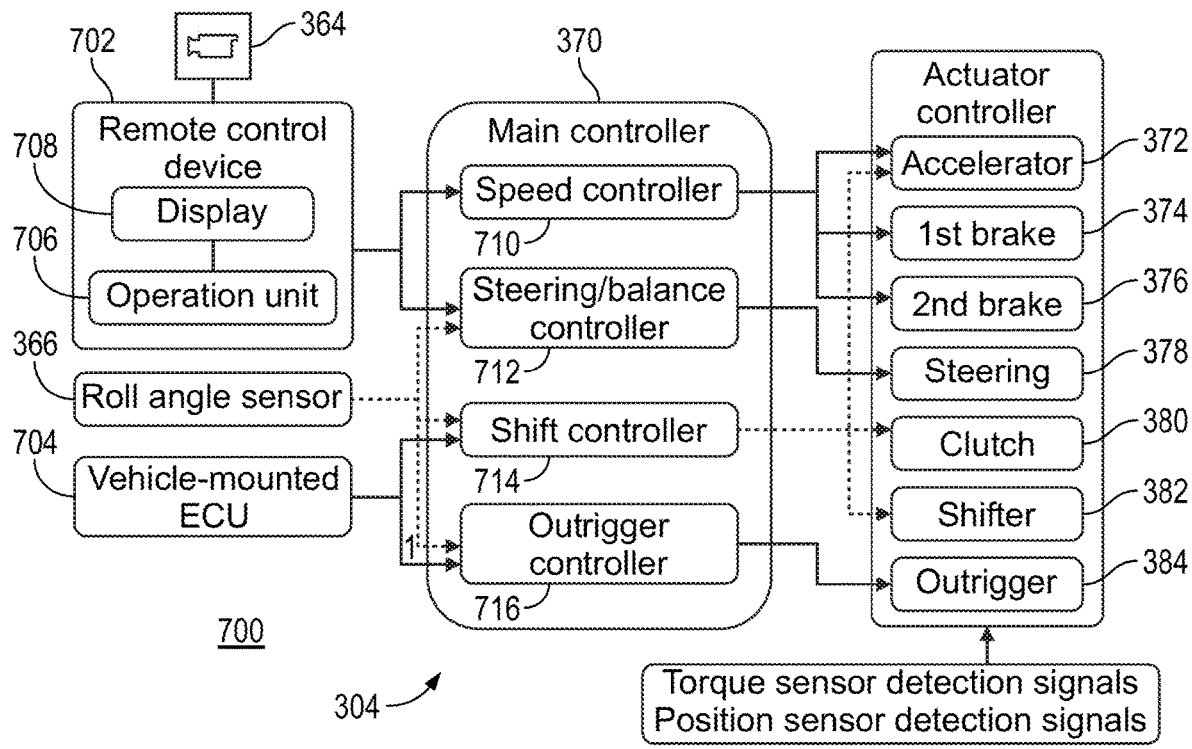
FIG. 7 illustrates a block diagram of a robot control system, in accordance with an example implementation.

FIG. 7 illustrates a block diagram of a robot control system 700, in accordance with an example implementation. As shown in FIG. 7, the robot control system 700 includes the control unit 304 and a remote control device 702. The control unit 304 includes the main controller 370 and the actuator control modules 372-384.

As mentioned above with respect to FIG. 3A, the actuator control modules 372-384 are configured to control the various actuators of the robot 100 and the motorcycle 200. Specifically, the accelerator module 372 is configured to control the accelerator actuator 318, the first brake module 374 is configured to control the first brake actuator 326, the second brake module 376 is configured to control the second (rear) brake actuator 358, the steering module 378 is configured to control the steering actuator 322 (e.g., the rotary actuator 508), the clutch module 380 is configured to control the clutch actuator 346, the shifter module 382 is configured to control the shift actuator 342, and the outrigger module 384 is configured to control the outrigger actuators (e.g., the outrigger actuator 426). The outrigger module 384 could be coupled to the motorcycle 200 or the robot 100.

In examples, the actuator control modules 372-384 may be included within the control unit 304 along with the main controller 370. In other examples, the actuator control modules 372-384 may be separate from the controller 370 and may each have its own processor and memory programmed with instructions that, when executed by a respective processor, control a respective actuator.

The actuator control modules 372-384 may be in wired or wireless communication with the main controller 370. The actuator control modules 372-384 may provide information to the main controller 370 and may receive commands from the main controller 370 to actuate the respective actuators.

As mentioned above, the main controller 370 includes at least one processor and a memory or data storage having program instructions stored thereon. The main controller 370 may be in wired or wireless communication with an onboard vehicle engine control unit (ECU) 704 and may be configured to receive control information of the motorcycle 200 from the vehicle ECU 704. The control information of the motorcycle 200 may include, for example, vehicle speed, engine speed, transmission gear position, etc. The vehicle speed can be a rotation speed of the front wheel 204 or the rear wheel 202.

The main controller 370 may further receive an operation signal from the remote control device 702 (e.g., via the antenna 368). Based on the operation signal, the control information from the ECU 704, and roll angle information from the roll angle sensor 366, the main controller 370 may send command signals to the actuator control modules 372-384 to operate their respective actuators accordingly.

The remote control device 702 may be located away from the robot 100. The remote control device 702 may include an operation unit 706 and a display 708. The operation unit 706 may include, for example, a joystick. The operator of the remote control device 702 can enter an accelerator command and steering command via the operation unit 706. The accelerator command could be acceleration or deceleration command and the steering command could be a left or right turn command.

The operation unit 706 sends signals indicating these commands to the main controller 370. For example, when the joystick is tilted forward, the operation unit 706 sends an acceleration command to the main controller 370 based on the amount of tilt of the joystick. When the joystick is tilted rearward, the operation unit 706 transmits a deceleration command to the main controller 370 based on the amount of tilt. By tilting the joystick to the left, the operation unit 706 transmits a left turn steering command to the main controller 370 based on the amount of tilt to the left. By tilting the joystick to the right, the operation unit 706 transmits a right turn steering command to the main controller 370 based on the amount of tilt to the right.

A joystick is used herein as an example, and the operation unit 706 may be a device or a user interface other than a joystick. For example, the operation unit 706 may include a touch screen with user-interface items that the operator can use to provide acceleration and steering commands.

The display 708 may be configured to receive and display images or video based on image data received from the imaging device 364. These images or video may inform the operator about the environment of the robot 100 and the motorcycle 200 to enable the operator to accelerate, decelerate, and steer the motorcycle 200 appropriately via the operation unit 706.

In an example, the main controller 370 may be configured to analyze the image data received from the imaging device 346 and identify based on the image data any obstacles in a travel path of the robot 100 and the motorcycle 200. The main controller 370 may then determine the steering command and the accelerator command so as to avoid the obstacles and safely navigate the motorcycle 200.

The main controller 370 may receive the accelerator and steering commands and accordingly provide signals to the actuator control modules 372-384. Specifically, the main controller 370 may include a speed controller 710 that may include software modules, hardware components, or a combination thereof. The speed controller 710 may receive the accelerator command and accordingly send signals to the accelerator module 372, the first brake module 374, and the second brake module 376 to achieve the commanded acceleration/deceleration.

Particularly, the speed controller 710 may determine a target operational position for the accelerator 314 based on the accelerator command. The speed controller 710 may then send a command signal indicating the target operation position to the accelerator module 372. The accelerator module 372 then generates a signal to the accelerator actuator 318 so as to cause the actual operating position of the accelerator 314 detected by the position sensor 320 of the accelerator actuator 318 to approach the target operational position.

In particular, for an acceleration command, the accelerator module 372 outputs a first driving signal to the accelerator actuator 318 to operate the accelerator 314 to open or further open a throttle of the engine 208. For a deceleration command, the accelerator module 372 outputs a signal to the accelerator actuator 318 to operate the accelerator 314 to reduce opening of the throttle of the engine 208. Further, for a deceleration command, the speed controller 710 may determine a first target torque for the first brake actuator 326 and a second target torque of the second brake actuator 358. The speed controller 710 sends a command signal indicating the first target torque to the first brake module 374 and a command signal indicating the second target torque to the second brake module 376.

To achieve the first target torque, the first brake module 374 sends a signal to the first brake actuator 326 so as to cause the torque of the first brake operator 328 detected by the torque sensor 332 to approach the first target torque. Similarly, the second brake control module 376 sends a signal to the second brake actuator 358 so as to cause the torque of the second brake operator 356 detected by the torque sensor 360 to approach the second target torque. If there is no change in the accelerator command, the accelerator module 372 holds the accelerator 314 to its current operating position.

The main controller 370 may further include a steering/balance controller 712 configured to perform steering and/or balance control in accordance with the steering command from the remote control device 702. The steering/balance controller 712 may include software modules, hardware components, or a combination thereof.

When the steering command is a right turn or a left turn, the steering/balance controller 712 determines a target steering angle of the handlebar 308 (i.e., the left and right handlebars 502 and 504) based on the steering command from the remote control device 702. In response, the steering/balance controller 712 sends a command signal indicating the target steering angle to the steering module 378.

When the steering command indicates maintaining a straight path, the steering module 378 generates a signal to the steering actuator 322 (i.e., the rotary actuator 508) to cause the actual roll angle detected by the roll angle sensor 366 to be within a threshold value of zero roll angle to maintain a straight path. The steering module 378 may also generate the signal to the steering actuator 322 based on a torque detected by a torque sensor (e.g., the torque sensor 324 or 532) coupled to the steering actuator 322 and the actual steering angle of handlebar 308 detected by the steering position sensor 312.

When the steering command indicates a right turn or a left turn, the steering module 378 generates the steering signal to the steering actuator 322 based on one or more of several inputs: (i) the actual torque detected by the torque sensor 324 of the steering actuator 322, (ii) the actual steering angle of the handlebar 308 detected by the steering position sensor 312, (iii) the actual roll angle detected by the roll angle sensor 366, and (iv) the target steering angle.

In an example, a turning radius is determined based on the steering command. Then, the steering controller 712 determines a target roll angle, a target steering angle, and a target steering torque based on the turning radius and the speed of the motorcycle 200. Based on determined target values, the steering controller 712 generates the steering command to the steering module 378, which provides a corresponding steering signal to the steering actuator 322. The steering controller 712 determines the steering command to reduce the difference between the target roll angle and the actual roll angle while monitoring the actual steering torque and the actual roll angle from the roll angle sensor 366 to achieve the commanded turn smoothly.

The main controller 370 may further include a shift controller 714 configured to, based on the control information from the vehicle ECU 704, generate a gear-shift command. For instance, the shift controller 714, based on the vehicle speed received from the vehicle ECU 704, automatically performs a gear change operation by generating the shift command. The shift controller 714 may include software modules, hardware components, or a combination thereof.

Figure 8A:
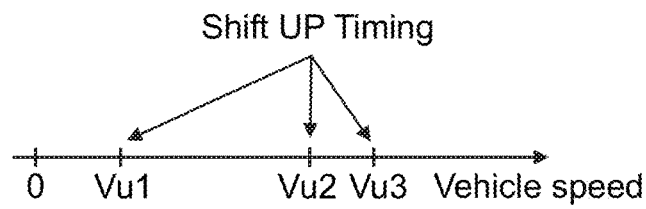
FIG. 8A is a diagram illustrating timing of shift-up, in accordance with an example implementation.

FIG. 8A is a diagram illustrating timing of shift-up, in accordance with an example implementation. As shown in FIG. 8A, when the speed of the motorcycle 200 reaches a first up-shift value, "Vu1," the shift controller 714 generates a signal to shift up the transmission from a first gear to a second gear allowing for higher speeds. When the speed increases to a second up-shift value, "Vu2," the shift controller 714 generates a signal to shift up the transmission from the second gear to a third gear. When the speed further increases to a third up-shift value, "Vu3," the shift controller 714 generates a signal to shift up the transmission from the third gear to a fourth gear. In examples, however, when the roll angle that the roll angle sensor 366 detects is equal to or greater than a predetermined threshold value, the shift controller 714 may prevent a shift-up in order to avoid destabilizing the motorcycle 200.

Figure 8B:
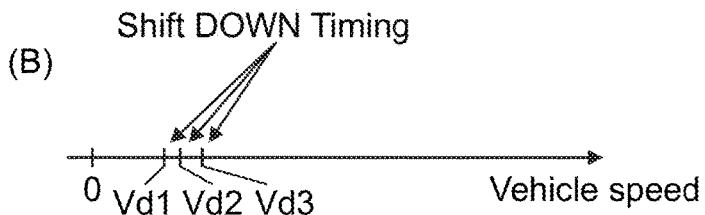
FIG. 8B is a diagram illustrating timing of shift-down, in accordance with an example implementation.

FIG. 8B is a diagram illustrating timing of shift-down, in accordance with an example implementation. As shown in FIG. 8B, when the speed of the motorcycle 200 decreases to a third down-shift value, "Vd3," the shift controller 714 generates a signal to shift down the transmission from the fourth gear to the third gear. When the speed further decreases to a second down-shift value, "Vd2," the shift controller 714 generates a signal to shift down the transmission from the third gear to the second gear. When the speed decreases even further to a first down-shift value, "Vd1," the shift controller 714 generates a signal to shift down the transmission from the second gear to the first gear. In some examples, when the roll angle that the roll angle sensor 366 detects is equal to or greater than the predetermined threshold value, the main controller 370 may prevent downshifting to avoid destabilizing the motorcycle 200. Four gears were used herein as an example for illustration. However, a greater or fewer number of gears could be used.

Figure 9:
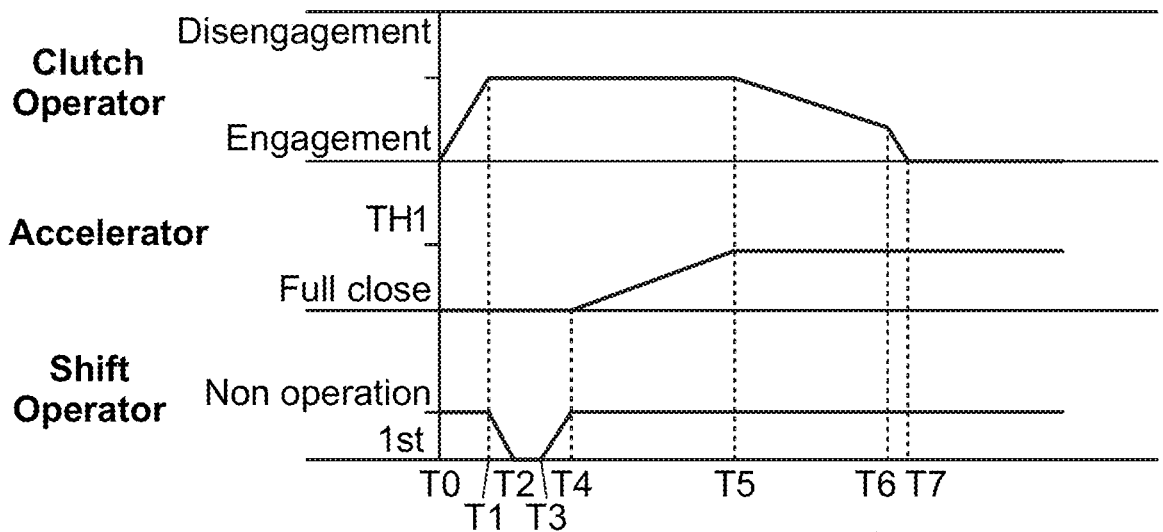
FIG. 9 illustrates a timing chart at a beginning of executing a shift command, in accordance with an example implementation.
Figure 10:
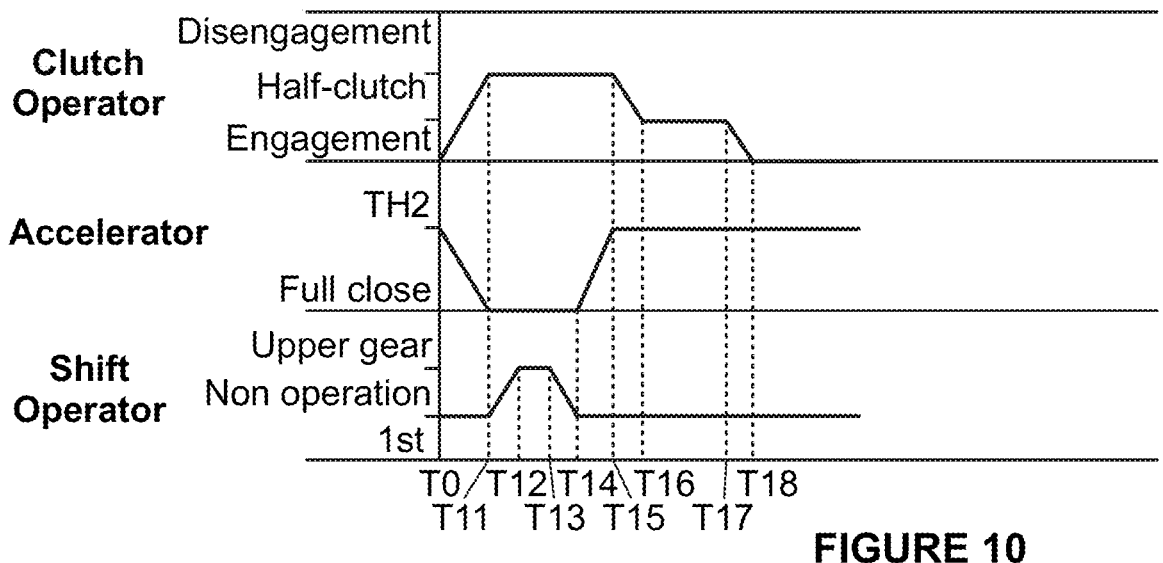
FIG. 10 is a timing chart illustrating shifting up, in accordance with an example implementation.
Figure 11:
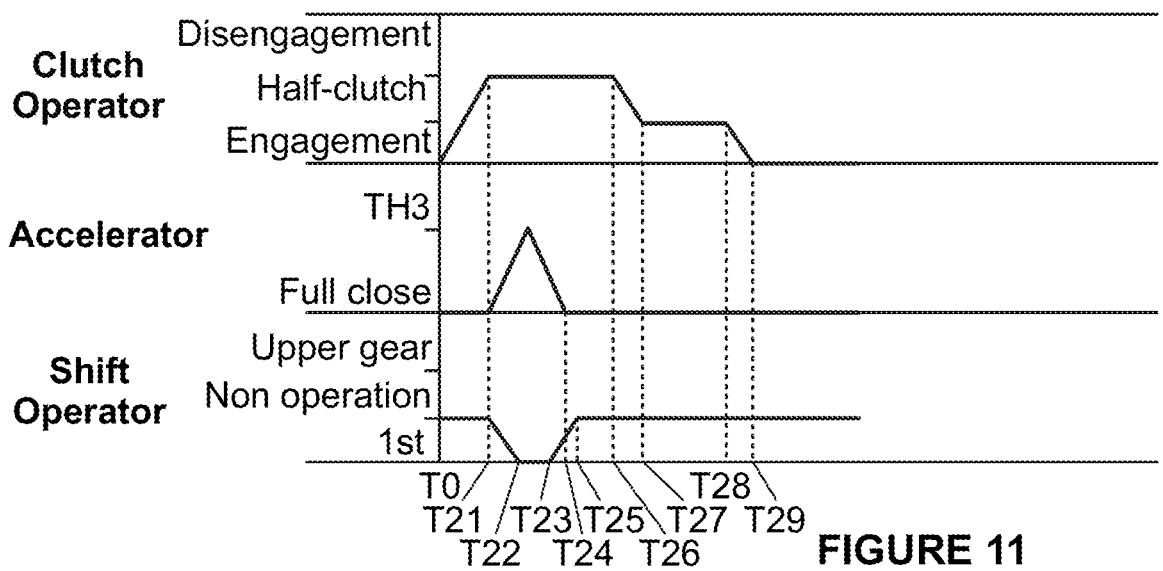
FIG. 11 is a timing chart illustrating shifting down, in accordance with an example implementation.

Referring back to FIG. 7, the shift controller 714 outputs command signals to the accelerator module 372, the shift module 382, and the clutch module 380 based on the shift command. In response to the signals from the shift controller 714, the clutch module 380, the accelerator module 372, and the shift controller 68 generate respective signals to the respective actuators. FIGS. 9, 10, and 11 illustrate timing of accelerator, clutch, and shifter commands, in accordance with an example implementation.

FIG. 9 illustrates a timing chart at a beginning of executing a shift command, in accordance with an example implementation. Particularly, FIG. 9 illustrates changes over time in the state of clutch operator 348 (top), the state of the accelerator 314 (middle), and the state of the shift operator 338 (bottom).

As shown in FIG. 9, when the motorcycle 200 is stopped at time (T0), the clutch operator 348 is in the engagement position, the accelerator 314 is in the fully closed position, and a shift operator 338 is in a neutral or non-operating position. At this point, the transmission is in a neutral state.

To implement a shift command, the control unit 304 sends a command to change a position of the clutch operator 348 from the engagement position to the disengagement position at time (T1) to switch the clutch from the engaged state to the disengaged state and prepare for a gear-shift. When the clutch is switched from the engaged state to the disengaged state, the control unit 304 changes the operating position of the shift operator 338 from the non-operation position to the first gear position at time (T2). When the transmission is switched from the neutral position to the first gear position at time (T3), the control unit 304 returns the shift operator 338 to the non-operation position at time (T4).

When the shift operator 338 is returned to the non-operation position, the control unit 304 operates the accelerator 314 in the throttle opening direction at time (T4). When the accelerator 314 is operated in the throttle opening direction, rotational speed of the engine 208 increases. When the engine speed reaches a predetermined rotational speed, the control unit 304 holds the accelerator 314 to the operating position (TH1) at time (T5). Substantially simultaneously, the control unit 304 sends a signal to change position of the clutch operator 348 from the disengagement position toward the engagement position gradually between time (T5) and time (T6).

In an example, the control unit 304 may determine the rotational speed difference between the upstream side and the downstream side of the clutch. The rotational speed difference, for example, is determined from the rotational speed of the engine 208 and the rotational speed of the rear wheel 202. When the rotational speed difference is determined to be smaller than a predetermined threshold at time (T6), the control unit 304 causes the clutch operator 348 to move to the engagement position. Thus, the clutch is engaged, the shift operation is completed at time (T7).

FIG. 10 is a timing chart illustrating shifting up, in accordance with an example implementation. Particularly, FIG. 10 illustrates changes over time in the state of clutch operator 348 (top), the state of the accelerator 314 (middle), and the state of the shift operator 338 (bottom) during shifting up from a lower gear to a higher gear.

As shown in FIG. 10, before the shift-up at time (T0), the clutch operator 348 is in an engagement position and the clutch is engaged, the accelerator 314 is located at a predetermined operating position (TH2), and the shift operator 338 is located in the non-operation position. At this point, the transmission is in a first gear or a higher gear position.

When the shifting up command is generated, the control unit 304 sends signals to move the clutch operator 348 from the engagement position to the disengagement position and return the accelerator 314 to the fully closed position at time (T11). When the clutch is switched from the engaged state to the disengaged state, the control unit 304 sends a signal to switch the shift operator 338 from the non-operation position to the shift-up position at time (T12). As a result, the transmission gear is switched to the higher-speed gear at time (T13), and the control unit 304 then returns the shift operator 338 to the non-operation position at time (T14).

When the shift operator 338 is returned to the non-operation position, the control unit 304 substantially simultaneously actuates the accelerator 314 in the throttle opening direction back to the operating position (TH2) at time (T15). The control unit 304 then maintains the accelerator 314 at the operating position (TH2).

When the accelerator 314 is returned to the operating position (TH2), the control unit 304 moves the clutch operator 348 to a half-clutch position from the disengagement position, and then the clutch operator 348 is held in the half-clutch position between time (T16) and time (T17). In this case, the control unit 304 may determine difference in the rotational speed between the upstream side and the downstream side of the clutch. When the difference is smaller than a predetermined threshold value at time (T17), the control unit 304 moves the clutch operator 348 to the engagement position so as to place the clutch is the engaged state. The shift-up operation is completed at time (T18).

FIG. 11 is a timing chart illustrating shifting down, in accordance with an example implementation. Particularly, FIG. 11 illustrates changes over time in the state of clutch operator 348 (top), the state of the accelerator 314 (middle), and the state of the shift operator 338 (bottom) during shifting down from a higher gear to a lower gear As shown in FIG. 11, before the shift-down at time (T0), the clutch operator 348 is in an engagement position, the accelerator 314 is located in the fully closed position and the shift operator 338 is in the non-operation position. At this point, the transmission is in second gear or a higher gear position.

When the shift-down command is generated, the control unit 304 sends a signal to move the clutch operator 348 from the engagement position to the disengagement position at time (T21). When the clutch is switched from the engaged state to the disengaged state at time (T21), the control unit 304 sends a signal to move the accelerator 314 in the throttle opening direction to a predetermined position (TH3) and then return it to the fully closed position at time (T24) so as to make the speed of the engine 208 greater than a predetermined rotational speed.

Additionally, the control unit 304 sends a signal to switch the shift operator 338 from the non-operation position to the shift-down position at time (T22) along with the above-mentioned movement of the accelerator 314. The transmission gear is thus switched to the low speed gear at time (T23) and the control unit 304 then returns the shift operator 338 to the non-operation position at time (T25).

When the rotational speed of the engine 208 is increased to reach the predetermined speed by the above-mentioned movement of the accelerator 314, at time (T26) the control unit 304 sends a signal to move the clutch operator 348 from the disengagement position to the partial engagement position, and holds the clutch operator 348 in the half-clutch position between time (T27) and time (T28).

In this case, the control unit 304 determines a difference in the rotational speed between the upstream side and the downstream side of the clutch. When the difference is smaller than a predetermined threshold value at time (T28), the control unit 304 moves the clutch operator 348 to the engagement position. As a result, the clutch is engaged and the shift-down operation is completed at time (129).

VII. ALTERNATIVE EXAMPLE ROBOT CONTROL SYSTEM

The control system 700 is described with reference to operating the robot 100 and the motorcycle 200 via the remote control device 702. However, in examples, the robot 100 may be configured to automatically control the motorcycle 200 without signals from a remote control device.

Figure 12:
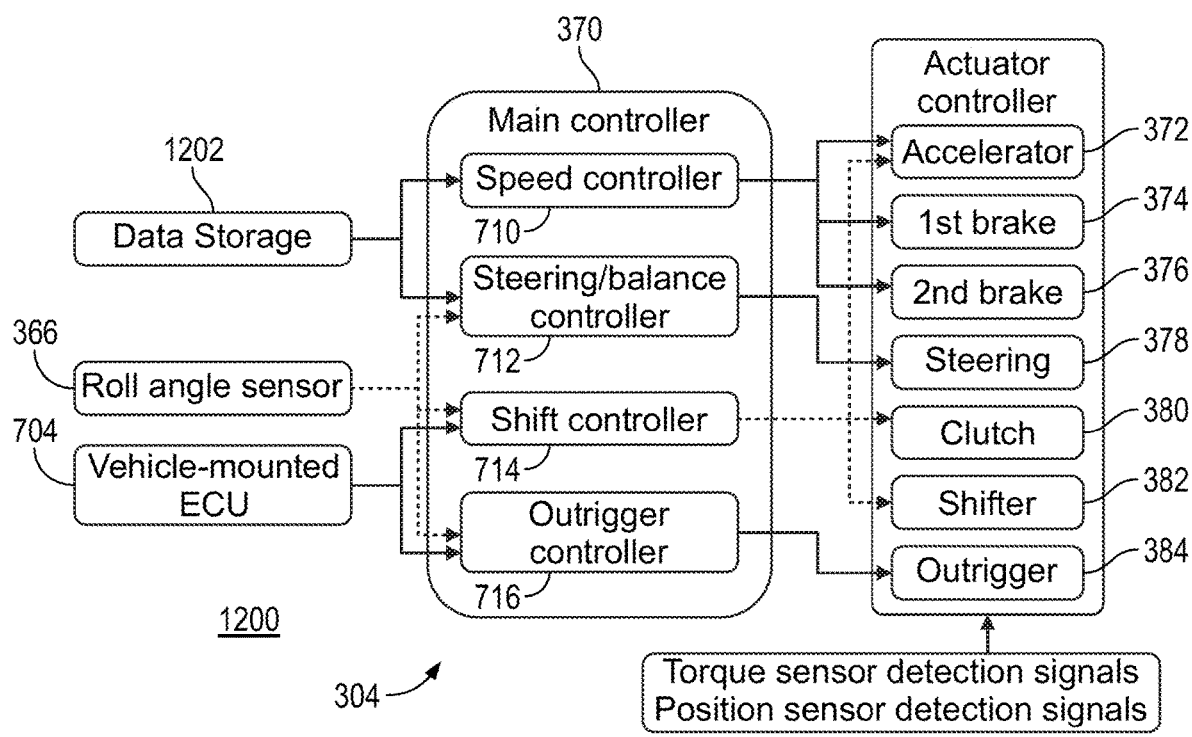
FIG. 12 illustrates a block diagram of an alternative robot control system, in accordance with an example implementation.

FIG. 12 illustrates a block diagram of an alternative robot control system 1200, in accordance with an example implementation. As shown in FIG. 12, the robot 100 may include a memory or data storage 1202 (e.g., any type of memory, non-transitory computer-readable medium, transitory computer-readable medium, or both a non-transitory computer-readable medium and a transitory computer-readable medium). The data storage 1202 may be coupled to the robot 100 or the motorcycle 200.

The data storage 1202 may store a sequence of accelerator commands and steering commands, and the control unit 304 may acquire these commands from the data storage 1202 to operate the robot 100 and the motorcycle 200. Alternatively, the data storage 1202 may store a travel route for the motorcycle 200. The control unit 304 may then determine the accelerator commands and steering commands to execute the travel route.

In an example, the data storage 1202 may be built in the robot 100, and the control unit 304 may receive accelerator commands, steering commands, shift commands, and a travel route from the data storage 1202 via wired or wireless communication. Alternatively, the data storage 1202 may include a recording medium removable from the robot 100. The removable medium could be connected to other computing devices to acquire operating instruction/commands and the travel route. The data storage 1202 may then be reconnected to the robot 100 or the motorcycle to transmit the operating instruction/commands and the travel route to the control unit 304.

In an example, the data storage 1202 may store thereon a target position and a target speed for the motorcycle 200. The robot 100 or the motorcycle 200 may include a global position system (GPS) device. The GPS device may include any sensor configured to estimate a geographic location of the robot 100 or the motorcycle 200. To this end, the GPS device may include a transceiver configured to estimate a position of the robot 100 or the motorcycle 200 with respect to the Earth based on satellite-based positioning data.

The GPS device may be in communication with the main controller 370 or the control unit 304 and may be configured to provide information indicative of the location of robot 100 or the motorcycle 200 thereto. The control unit 304 may then determine the steering command and the accelerator command based at least in part on the target position, the target speed, and the location information received from the GPS device so as to navigate to the target position.

In the above implementations, the motorcycle 200 is used as an example for illustration, but any other type of vehicle could be used. A vehicle could be a mobile machine that can be used to transport a person, people, or cargo. As an example, any vehicle discussed herein can be driven and/or otherwise guided along a path (e.g., a paved road or otherwise) on land, in water, on water, or in the air or outer space. As another example, any vehicle discussed herein can be wheeled, tracked, railed, or skied. As yet another example, any vehicle discussed herein can include an automobile, a motorcycle, an all-terrain vehicle (ATV) defined by ANSI/SVIA-1-2007, a snowmobile, a personal watercraft, a light-duty truck, a medium-duty truck, a heavy-duty truck, a semi-tractor, a farm machine, or a construction machine. As an example, a vehicle guided along a path can include a van (such as a dry or refrigerated van), a tank trailer, a platform trailer, or an automobile carrier.

Further, accelerator operation member is not limited to the accelerator grip described above, but may include other forms such as an accelerator pedal or an accelerator lever. Also, the steering operator is not limited to a handlebar, but may include a steering lever, steering wheel, or any other form. Further, the brake operator and clutch operator may be modified to operate similar to the shift operator. In examples, the brake operator, clutch operator, or shift operator may be omitted.

Further, the structure of the robot 100 is not limited to the structure of the above implementations. For example, the structure of the left and right feet, the left and right legs, the left and right arms, or the left and right hands may be changed. The structure of the outriggers may also be changed. Alternatively, the outriggers may be omitted.

The structure of the control unit 304 may also be changed. For example, in the above-described implementations, the main controller 370 and the actuator control modules 372-384 are provided separately. In other implementations, all or some of them may be integrated in a single controller. The configuration of the motorcycle 200 may also be changed. For example, the engine 208, the fuel tank 210, and the position of the driver's seat 212 may be changed. Additionally, more than one front wheel could be used and more than one rear wheel could be used.

VIII. CONCLUSION

It should be understood that arrangements described herein are for purposes of example only. As such, those skilled in the art will appreciate that other arrangements and other elements (e.g., machines, interfaces, orders, and groupings of operations, etc.) can be used instead, and some elements may be omitted altogether according to the desired results.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A robot configured to drive a vehicle, the robot comprising:
   an accelerator actuator configured to operate an accelerator operator of the vehicle;
   an arm configured to steer the vehicle;
   an actuator coupled to the arm via a link;
   a controller configured to:
      in response to an accelerator command, send a first signal to the accelerator actuator to operate the accelerator operator, and
      in response to a steering command, send a second signal to the actuator, thereby causing the actuator to apply a particular torque to the link so as to steer the vehicle; and
   a memory in communication with the controller and configured to store thereon a travel route for the vehicle, wherein the controller is configured to determine the first signal and the second signal based on the travel route.

2. The robot of claim 1, wherein the vehicle comprises:
   a handlebar, wherein the arm of the robot is configured to couple to an end of the handlebar.

3. The robot of claim 2, wherein:
   the link, the arm, and a portion of the handlebar form a four-bar mechanism.

4. The robot of claim 3, wherein:
   the arm is a first arm and the link is a first link, and the four-bar mechanism is a first four bar mechanism,
   the robot includes a second arm,
   the actuator is coupled to the first arm via the first link and is coupled to the second arm via a second link, and
   the second link, the second arm, and another portion of the handlebar form a second four-bar mechanism symmetric with respect to the first four-bar mechanism, such that a particular position of the actuator determines an angle of the handlebar.

5. The robot of claim 4, wherein the first four-bar mechanism and the second four-bar mechanism are arranged such that there is a 1:1 ratio between the particular position of the actuator and the angle of the handlebar.

6. The robot of claim 1, further comprising:
   a brake actuator configured to operate a brake operator of the vehicle, wherein the controller is further configured to:
      in response to a brake command, send a third signal to the brake actuator to operate the brake operator.

7. The robot of claim 6, wherein the brake actuator comprises a twisted string actuator that comprises an electric motor coupled to a string element comprising a plurality of flexible strands, wherein the third signal actuates the electric motor to cause the string to twist and a length of the string to decrease.

8. The robot of claim 1, further comprising:
a roll angle sensor, wherein the controller is configured to send the second signal to the actuator based on a difference between a target roll angle determined by the steering command and an actual roll angle detected by the roll angle sensor.

9. The robot of claim 1, further comprising:
a shift actuator configured to operate a gear-shift operator of the vehicle, wherein the controller is further configured to:
in response to a shift command, send a third signal to the shift actuator to operate the gear-shift operator.

10. The robot of claim 1, further comprising:
a clutch actuator configured to operate a clutch operator of the vehicle, wherein the controller is further configured to:
in response to a clutch command, send a third signal to the clutch actuator to operate the clutch operator.

11. The robot of claim 10, wherein the clutch actuator comprises a twisted string actuator that comprises an electric motor coupled to a string element comprising a plurality of flexible strands, wherein the third signal actuates the electric motor to cause the string to twist and a length of the string to decrease.

12. A system comprising:
a vehicle comprising an accelerator operator and a steering operator;
a robot comprising: (i) an accelerator actuator coupled to the accelerator operator of the vehicle and configured to operate the accelerator operator, and (ii) a steering actuator coupled to the steering operator of the vehicle and configured to operate the steering operator;
at least one outrigger coupled to the vehicle or the robot and configured to be in either a undeployed state or a deployed state, wherein in the deployed state, the outrigger is configured to engage a surface when the vehicle is at a predetermined lean angle to laterally stabilize the vehicle;
an outrigger actuator configured to switch the outrigger from the undeployed state to the deployed state;
a controller configured to:
in response to an accelerator command, send a first signal to the accelerator actuator to operate the accelerator operator of the vehicle,
in response to a steering command, send a second signal to the steering actuator to steer the vehicle, and
in response to an outrigger deploy signal, send a third signal to actuate the outrigger actuator so as to switch the outrigger from the undeployed state to the deployed state to laterally stabilize the vehicle; and
a memory in communication with the controller and configured to store thereon a travel route for the vehicle, wherein the controller is configured to determine the first signal and the second signal based on the travel route.

13. The system of claim 12, wherein the outrigger comprises one or more supporting members and an expansion member, wherein:
proximal ends of the one or more supporting members and the expansion member are rotatably coupled to the vehicle at respective pivots, and
distal ends of the one or more supporting members and the expansion member are coupled to a pad configured to engage the surface when the outrigger is in the deployed state.

14. The system of claim 13, wherein the outrigger further comprises:
a biasing member coupled to the expansion member and configured to apply a biasing force on the outrigger to bias the outrigger toward the deployed state;
a holding member that couples the outrigger actuator to one of the one or more supporting members, wherein the holding member is configured to hold the outrigger in the undeployed state against the biasing force of the biasing member, wherein when the outrigger actuator is triggered while the outrigger is in the undeployed state, the holding member is released and the biasing member causes the outrigger to switch from the undeployed state to the deployed state.

15. The system of claim 14, wherein the biasing member comprises at least one of a compression linear spring or a torsional spring.

16. The system of claim 14, wherein the holding member comprises a wire loop that connects the outrigger actuator to the one of the one or more supporting member.

17. The system of claim 14, wherein the expansion member includes a first expansion link and a second expansion link coupled to the first expansion link via a pivot, wherein the biasing member is mounted across the pivot and is configured to apply the biasing force to bias the second expansion link away from the first expansion link, and wherein when the holding member is released, the biasing member pushes the second expansion link away from the first expansion link, thereby causing the outrigger to switch from the undeployed state to the deployed state.

18. The system of claim 12, wherein the outrigger actuator comprises a hydraulic or pneumatic cylinder, wherein the vehicle further comprises: (i) a source of pressurized fluid; (ii) a first valve disposed between the source of pressurized fluid and the cylinder, wherein the first valve blocks a first fluid path between the source and the cylinder; and
(iii) a second valve disposed between the source of pressurized fluid and the cylinder, wherein the second valve blocks a second fluid path between the source of pressurized fluid and the cylinder.

19. The system of claim 18, wherein:
in response to the outrigger deploy signal during normal operation, the controller opens the first valve to open the first fluid path between the source of pressurized fluid and the cylinder so as to actuate the outrigger actuator and deploy the outrigger, and
in response to the outrigger deploy signal indicating an emergency signal or that a speed of the vehicle is below a threshold speed, the controller opens the second valve to open the second fluid path between the source of pressurized fluid and the cylinder so as to actuate the outrigger actuator and deploy the outrigger.

20. The system of claim 19, further comprising:
a rear brake actuator, wherein in response to the emergency signal or the speed of the vehicle being below the threshold speed, the controller opens the second valve to open a third fluid path between the source of pressurized fluid and the rear brake actuator to actuate a rear brake of the vehicle while deploying the outrigger.

21. A system comprising:
a vehicle comprising an accelerator operator and a steering operator;

a robot comprising: (i) an accelerator actuator coupled to the accelerator operator of the vehicle and configured to operate the accelerator operator, and (ii) a steering actuator coupled to the steering operator of the vehicle and configured to operate the steering operator;

a controller configured to:
in response to an accelerator command, send a first signal to the accelerator actuator to operate the accelerator operator of the vehicle, and
in response to a steering command, send a second signal to the steering actuator to steer the vehicle; and a memory in communication with the controller and configured to store thereon a travel route for the vehicle, wherein the controller is configured to determine the first signal and the second signal based on the travel route.

22. The system of claim 21, wherein the vehicle further comprises: a shift operator and a clutch operator, wherein the robot further comprises: a shift actuator configured to operate the shift operator and a clutch actuator configured to operate the clutch operator, and wherein the controller is further configured to, in response to a gear shift instruction, send the first signal to the accelerator actuator, a third signal to the clutch actuator, and a fourth signal to the shift actuator so as to sequentially actuate the accelerator operator, disengage a clutch, and actuate the shift operator to cause a gear shift.

23. The system of claim 21, wherein the robot further comprises a main body that is placed on a driver's seat of the vehicle, and wherein at least one of the accelerator actuator or the steering actuator is connected to the main body.

24. The system of claim 23, wherein the main body includes a seating member coupled to the driver's seat.

25. The system of claim 21,
wherein the memory is further configured to store thereon the accelerator command and the steering command, wherein the controller is configured to receive the accelerator command and the steering command from the memory.

26. The system of claim 21, wherein the robot further comprises:
a global positioning system (GPS) device in communication with the controller and configured to provide the controller with information indicative of a current position of the robot, wherein the controller determines the first signal and the second signal further based on a target position for the vehicle, a target speed for the vehicle, and the information indicative of the current position of the robot, wherein the target position and the target speed are stored in the memory.

27. The system of claim 21, further comprising:
a remote control device, wherein the controller receives the accelerator command and the steering command from the remote control device.

28. The system of claim 27, further comprising:
an imaging device coupled to the robot or the vehicle and in communication with the controller, wherein the controller is configured to transmit image data captured by the imaging device for an environment of the robot and the vehicle to the remote control device, wherein the remote control device includes a display configured to display one or more images based on the image data received from the controller.

29. The system of claim 21, wherein the robot further comprises an imaging device configured to provide the controller with image data for an environment of the robot, wherein the controller is configured to:
identify, based on the image data, an obstacle in a path of the vehicle, and
determine the second signal so as to avoid the obstacle.

30. The system of claim 21, wherein the vehicle further comprises: a brake operator, wherein the robot further comprises a brake actuator configured to operate the brake operator, and wherein the controller is further configured to send the first signal to the accelerator actuator and a third signal to the brake actuator so as to achieve a particular acceleration or deceleration for the vehicle.

* * * * *